US012170613B2

(12) United States Patent
Chen et al.

(10) Patent No.: US 12,170,613 B2
(45) Date of Patent: *Dec. 17, 2024

(54) SEGMENT ROUTING MPLS POINT TO MULTIPOINT PATH

(71) Applicant: Huawei Technologies Co., Ltd., Guangdong (CN)

(72) Inventors: Huaimo Chen, Bolton, MA (US); Donald Eggleston Eastlake, III, Apopka, FL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,514

(22) Filed: Jan. 3, 2023

(65) Prior Publication Data

US 2023/0143419 A1 May 11, 2023

Related U.S. Application Data

(63) Continuation of application No. PCT/US2021/024973, filed on Mar. 30, 2021.
(Continued)

(51) Int. Cl.
*H04L 45/50* (2022.01)
*H04L 45/122* (2022.01)
(Continued)

(52) U.S. Cl.
CPC ............ *H04L 45/50* (2013.01); *H04L 45/122* (2013.01); *H04L 45/16* (2013.01); *H04L 45/24* (2013.01); *H04L 12/28* (2013.01)

(58) Field of Classification Search
None
See application file for complete search history.

(56) References Cited

U.S. PATENT DOCUMENTS

| 8,223,669 B2 * | 7/2012 | Chen | H04L 45/50 370/254 |
| 8,488,616 B2 * | 7/2013 | Wijnands | H04L 45/02 370/395.5 |

(Continued)

FOREIGN PATENT DOCUMENTS

| CN | 105827529 A | 8/2016 | |
| CN | 111147373 A | 5/2020 | |
| WO | WO-2021257141 A1 * | 12/2021 | ............. H04L 45/16 |

OTHER PUBLICATIONS

Eckert, T., Ed., et al., "Tree Engineering for Bit Index Explicit Replication (BIER-TE)," draft-ietf-bier-te-arch-07, Network Working Group, Mar. 9, 2020, 45 pages.
(Continued)

*Primary Examiner* — Lashonda Jacobs-Burton
(74) *Attorney, Agent, or Firm* — Conley Rose, P.C.

(57) ABSTRACT

Disclosed is a mechanism implemented by an ingress node in a network. The mechanism comprises receiving a packet in Multiprotocol Label Switching (MPLS) format. A first segment list is pushed onto the packet. The first segment list describes a segment routing point to multipoint (SR P2MP) path as a list of multicast segment identifiers (SIDs) each comprising a multicast adjacency label. The packet is transmitted from a downstream interface along the SR P2MP path.

17 Claims, 10 Drawing Sheets

Related U.S. Application Data

(60) Provisional application No. 63/047,755, filed on Jul. 2, 2020.

(51) Int. Cl.
*H04L 45/16* (2022.01)
*H04L 45/24* (2022.01)
*H04L 12/28* (2006.01)

(56) References Cited

U.S. PATENT DOCUMENTS

| | | | | |
|---|---|---|---|---|
| 8,773,978 | B2* | 7/2014 | Chen | H04L 45/28 |
| | | | | 370/216 |
| 8,908,501 | B2* | 12/2014 | Chen | H04L 45/22 |
| | | | | 370/395.31 |
| 9,143,434 | B2* | 9/2015 | Chen | H04L 45/50 |
| 9,838,246 | B1* | 12/2017 | Hegde | H04L 41/0816 |
| 10,069,639 | B2* | 9/2018 | Bragg | H04L 12/66 |
| 10,158,558 | B1* | 12/2018 | Ward | H04L 45/16 |
| 10,686,699 | B2* | 6/2020 | Duncan | H04L 12/4641 |
| 11,165,691 | B1* | 11/2021 | Kompella | H04L 41/0806 |
| 11,695,685 | B2* | 7/2023 | Bidgoli | H04L 45/48 |
| | | | | 709/238 |
| 11,777,847 | B1* | 10/2023 | Shen | H04L 45/50 |
| | | | | 709/238 |
| 11,784,889 | B2* | 10/2023 | Bashandy | H04L 45/50 |
| 2009/0252058 | A1* | 10/2009 | Chen | H04L 45/12 |
| | | | | 370/254 |
| 2010/0008222 | A1* | 1/2010 | Le Roux | H04L 45/34 |
| | | | | 370/228 |
| 2012/0027013 | A1* | 2/2012 | Napierala | H04L 45/04 |
| | | | | 370/390 |
| 2013/0177018 | A1* | 7/2013 | Wijnands | H04L 45/50 |
| | | | | 370/390 |
| 2014/0269421 | A1* | 9/2014 | Previdi | H04L 12/4633 |
| | | | | 370/254 |
| 2017/0033939 | A1* | 2/2017 | Bragg | H04L 12/18 |
| 2018/0324090 | A1* | 11/2018 | Duncan | H04L 12/4641 |
| 2020/0358698 | A1* | 11/2020 | Song | H04L 45/50 |
| 2021/0092043 | A1* | 3/2021 | Filsfils | H04L 45/586 |
| 2021/0144086 | A1* | 5/2021 | Bidgoli | H04L 45/22 |
| 2021/0306259 | A1* | 9/2021 | Dutta | H04L 45/42 |
| 2021/0409321 | A1* | 12/2021 | Li | H04L 45/34 |
| 2022/0014460 | A1* | 1/2022 | Filsfils | H04L 45/52 |
| 2022/0269167 | A1* | 8/2022 | Gronenborn | G03F 7/70558 |
| 2023/0121236 | A1* | 4/2023 | Chen | H04L 45/50 |
| | | | | 370/390 |
| 2023/0269167 | A1* | 8/2023 | Bhargava | H04L 45/34 |
| | | | | 709/238 |

OTHER PUBLICATIONS

Chen, H., "SR-MPLS Point-to-Multipoint Path," draft-chen-pim-srv4-p2mp-path-00, Network Working Group, Jun. 2020, 12 pages.

* cited by examiner

400

| | | | | |
|---|---|---|---|---|
| P1-1mL | | Exp | S | TTL |
| Reserved | 0 | 2 | | 7 |
| P2-1mL | | Exp | S | TTL |
| Reserved | 1 | 2 | | 2 |
| P3-1mL | | Exp | S | TTL |
| Reserved | 2 | 1 | | 3 |
| PE1-1mL | | Exp | S | TTL |
| Reserved | 0 | 0 | | 0 |
| PE2-1mL | | Exp | S | TTL |
| Reserved | 0 | 0 | | 0 |
| P4-1mL | | Exp | S | TTL |
| Reserved | 0 | 2 | | 2 |
| PE3-1mL | | Exp | S | TTL |
| Reserved | 0 | 0 | | 0 |
| PE4-1mL | | Exp | S | TTL |
| Reserved | 0 | 0 | | 0 |

401

| | | | | |
|---|---|---|---|---|
| PE5-1mL | | Exp | S | TTL |
| Reserved | 0 | 0 | | 0 |

| P1-1mL | | Exp | S | TTL |
|---|---|---|---|---|
| Reserved | 0 | | 2 | 14 (7x2) |
| P2-1mL | | Exp | S | TTL |
| Reserved | 2 (1x2) | | 2 | 4 (2x2) |
| P3-1mL | | Exp | S | TTL |
| Reserved | 4 (2x2) | | 1 | 6 (3x2) |
| PE1-1mL | | Exp | S | TTL |
| Reserved | 0 | | 0 | 0 |
| PE2-1mL | | Exp | S | TTL |
| Reserved | 0 | | 0 | 0 |
| P4-1mL | | Exp | S | TTL |
| Reserved | 0 | | 2 | 4 (2x2) |
| PE3-1mL | | Exp | S | TTL |
| Reserved | 0 | | 0 | 0 |
| PE4-1mL | | Exp | S | TTL |
| Reserved | 0 | | 0 | 0 |

501

| PE5-1mL | | Exp | S | TTL |
|---|---|---|---|---|
| Reserved | 0 | | 0 | 0 |

| P1-1mL | | Exp | S | TTL |
|---|---|---|---|---|
| Reserved | 0 | 2 | | 10 |
| P2-1mL | | Exp | S | TTL |
| Reserved | 2 | 2 | | 2 |
| P3-1mL | | Exp | S | TTL |
| Reserved | 2 | 1 | | 3 |
| PE1-1nL | | Exp | S | TTL |
| PE2-1nL | | Exp | S | TTL |
| P4-1mL | | Exp | S | TTL |
| Reserved | 0 | 2 | | 2 |
| PE3-1nL | | Exp | S | TTL |
| PE4-1nL | | Exp | S | TTL |

601

| PE5-1nL | Exp | S | TTL |
|---|---|---|---|

| Multicast Adjacency Label | No. Branches | No. SIDs |
|---|---|---|

| | | |
|---|---|---|
| P1-1mL | 2 | 7 |
| P2-1mL | 2 | 2 |
| P3-1mL | 1 | 3 |
| PE1-1mL | 0 | 0 |
| PE2-1mL | 0 | 0 |
| P4-1mL | 2 | 2 |
| PE3-1mL | 0 | 0 |
| PE4-1mL | 0 | 0 |

801

| | | |
|---|---|---|
| PE5-1mL | 0 | 0 |

FIG. 8

SEGMENT ROUTING MPLS POINT TO MULTIPOINT PATH

CROSS-REFERENCE TO RELATED APPLICATIONS

This patent application is a continuation of International Application No. PCT/US2021/024973 filed on Mar. 30, 2021, by Futurewei Technologies, Inc., and titled "Segment Routing MPLS Point to Multipoint Path," which claims the benefit of U.S. Provisional Patent Application No. 63/047,755 filed Jul. 2, 2020 by Futurewei Technologies, Inc., and titled "Segment Routing MPLS Point To Multipoint Path," each of which is hereby incorporated by reference.

TECHNICAL FIELD

The present disclosure is generally related to network communications, and is more specifically to a mechanism to create a point to multipoint (P2MP) path using segment routing (SR) in a Multiprotocol Label Switching (MPLS) network.

BACKGROUND

Certain networks employ network states to route network packets. For example, a controller can create a path across a network by assigning forwarding states to nodes along the path. Each node may store one or more states for each path that crosses the node, for example in a forwarding table in memory. As a network continues to create new paths, the forwarding tables of such nodes can become progressively more crowded. As such, the memory assigned to such tables may limit the number of paths that can cross a node. Further, as a forwarding table increases in size, the processing resources used to search the forwarding table increases. Hence, path states employ increasing memory and processing resources as the number of paths in a network increase. As such, networks that use states to describe paths are not as scalable as stateless networks.

SUMMARY

In an embodiment, the disclosure includes a method implemented by an ingress node in an Multiprotocol Label Switching (MPLS) network, the method comprising: receiving, at a receiver of the ingress node, a packet; pushing onto the packet, by a processor of the ingress node, a first segment list describing a segment routing (SR) point to multipoint (P2MP) path as a list of multicast segment identifiers (SIDs) each comprising a multicast adjacency label; and transmitting, by a transmitter of the ingress node, the packet from a downstream interface along the SR P2MP path.

SR is a routing protocol that supports routing without maintaining states across a network. SR-MPLS is a type of SR that employs stacks of labels to describe a path. In point to point (P2P) routing, a packet is encapsulated with the label stack. Each node in a path can pop the top label from the packet and forward the packet according to the next label in the stack. In this way, the only node that maintains a state is the ingress node. Transit nodes and egress nodes forward based on the top label in the label stack, and hence the SR protocol is stateless over the core network. SR works well for P2P paths, but is not designed to support P2MP paths. For example, routing protocols that support P2MP paths are stateful, and hence do not integrate with the stateless approach used in SR-MPLS. For example, some routing protocols compute a P2MP path and create states at each node to support forwarding along the P2MP path.

The present example includes a SR based mechanism for creating and maintaining P2MP paths in a stateless manner through an MPLS network. In some examples, the MPLS network employs an Internet Protocol version four (IPv4) addressing scheme with thirty-two bit addresses. An ingress node can create a segment list that describes a P2MP path through the network. The segment list contains multicast SIDs of nodes in the P2MP path. The multicast SIDs may be implemented as multicast adjacency labels that identify links/interfaces for nodes along the P2MP path. A multicast SID contains a number of branches field and a number of SIDs field. The number of branches indicates the number of segments of the P2MP path that extend downstream from the corresponding node. The number of SIDs indicate the number of multicast nodes that are contained in the P2MP path downstream of the corresponding node. In an example, the number of branches field and the number of SIDs field can be included in the thirty-two bit SID containing the multicast adjacency label. In another example, the number of branches field and the number of SIDs field can be included in an associated information (A-I) field associated with the multicast adjacency label. In either case, the number of branches field and the number of SIDs field can be contained in the multicast SID. Such information can be pushed onto a packet by an ingress node via encapsulation as a label stack. The packet can then be transmitted downstream for duplication and/or routing along the P2MP path as indicated. For example, each current node (e.g., ingress and transit nodes) can duplicate the packet a number of times equal to the branches indicated by the multicast SID in the top label. The current node can then pop labels off the packets and push labels back onto the packets as desired to create segment list(s) that describe the sub-tree of the P2MP path downstream from the corresponding branch(es) of the current node. The current node can then forward each packet according to the top label of the segment list. This allows for the creation of stateless P2MP communication across an SR-MPLS network. As such, the described examples create additional functionality for nodes in an SR-MPLS core network. Further, the described examples remove the need to maintain states in the core network, and hence reduce memory and processor resource usage across the core network as the number of P2MP paths scale up. Hence, the described examples solve various problems specific to network communications and increase the functionality and/or operability of network communication devices.

Optionally, in any of the preceding aspects, another implementation of the aspect provides, further comprising: duplicating, by the processor, the packet to generate a copy of the packet; pushing, by the processor, a second segment list onto the copy of the packet; and transmitting, by the transmitter, the copy of the packet on a second downstream interface, wherein the segment list and the second segment list describe different sub-trees of the SR P2MP path.

Optionally, in any of the preceding aspects, another implementation of the aspect provides, wherein the SR P2MP path is stateless across the network.

Optionally, in any of the preceding aspects, another implementation of the aspect provides, wherein the segment list includes one or more labels, and wherein a top label of the segment list is a multicast adjacency label of a next hop along a sub-tree of the SR P2MP path.

Optionally, in any of the preceding aspects, another implementation of the aspect provides, wherein each multicast adjacency label is a twenty-bit field uniquely identifying an interface of a corresponding node.

Optionally, in any of the preceding aspects, another implementation of the aspect provides, wherein each multicast SID further comprises: a number of branches of a sub-tree downstream of the corresponding node, and a number of SIDs included in the sub-tree downstream of the corresponding node.

Optionally, in any of the preceding aspects, another implementation of the aspect provides, wherein the number of branches is a four bit field, and wherein the number of SIDs is an eight-bit field.

Optionally, in any of the preceding aspects, another implementation of the aspect provides, wherein one or more of the multicast SIDs are associated with one or more associated information blocks, and wherein each associated information block comprises: a location of a SID block for a sub-tree downstream of the corresponding node, a number of branches of the sub-tree downstream of the corresponding node, and a number of SIDs included in the sub-tree downstream of the corresponding node.

Optionally, in any of the preceding aspects, another implementation of the aspect provides, wherein the location of the SID block is an eight-bit field, wherein the number of branches is an eight-bit field, and wherein the number of SIDs is an eight-bit field.

Optionally, in any of the preceding aspects, another implementation of the aspect provides, wherein associated information blocks for egress nodes are omitted from the segment list.

In an embodiment, the disclosure includes a method implemented by a transit node in a network on a SR P2MP path, the method comprising: receiving, at a receiver of the transit node, a packet in MPLS format, the packet comprising an upstream segment list describing one or more subtrees of the SR P2MP path; determining, by the processor and based on the upstream segment list, a downstream segment list describing a sub-tree for a downstream interface of the transit node included in the SR P2MP path, the downstream segment list comprising a list of multicast SIDs each comprising a multicast adjacency label; replacing, by the processor, the upstream segment list associated with the packet with the downstream segment list; and transmitting, by a transmitter of the ingress node, the packet on the downstream interface along the SR P2MP path.

SR is a routing protocol that supports routing without maintaining states across a network. SR-MPLS is a type of SR that employs stacks of labels to describe a path. In P2P routing, a packet is encapsulated with the label stack. Each node in a path can pop the top label from the packet and forward the packet according to the next label in the stack. In this way, the only node that maintains a state is the ingress node. Transit nodes and egress nodes forward based on the top label in the label stack, and hence the SR protocol is stateless over the core network. SR works well for P2P paths, but is not designed to support P2MP paths. For example, routing protocols that support P2MP paths are stateful, and hence do not integrate with the stateless approach used in SR-MPLS. For example, some routing protocols compute a P2MP path and create states at each node to support forwarding along the P2MP path.

The present example includes a SR based mechanism for creating and maintaining P2MP paths in a stateless manner through an MPLS network. In some examples, the MPLS network employs an IPv4 addressing scheme with thirty-two bit addresses. An ingress node can create a segment list that describes a P2MP path through the network. The segment list contains multicast SIDs of nodes in the P2MP path. The multicast SIDs may be implemented as multicast adjacency labels that identify links/interfaces for nodes along the P2MP path. A multicast SID contains a number of branches field and a number of SIDs field. The number of branches indicates the number of segments of the P2MP path that extend downstream from the corresponding node. The number of SIDs indicate the number of multicast nodes that are contained in the P2MP path downstream of the corresponding node. In an example, the number of branches field and the number of SIDs field can be included in the thirty-two bit SID containing the multicast adjacency label. In another example, the number of branches field and the number of SIDs field can be included in an A-I field associated with the multicast adjacency label. In either case, the number of branches field and the number of SIDs field can be contained in the multicast SID. Such information can be pushed onto a packet by an ingress node via encapsulation as a label stack. The packet can then be transmitted downstream for duplication and/or routing along the P2MP path as indicated. For example, each current node (e.g., ingress and transit nodes) can duplicate the packet a number of times equal to the branches indicated by the multicast SID in the top label. The current node can then pop labels off the packets and push labels back onto the packets as desired to create segment list(s) that describe the sub-tree of the P2MP path downstream from the corresponding branch(es) of the current node. The current node can then forward each packet according to the top label of the segment list. This allows for the creation of stateless P2MP communication across an SR-MPLS network. As such, the described examples create additional functionality for nodes in an SR-MPLS core network. Further, the described examples remove the need to maintain states in the core network, and hence reduce memory and processor resource usage across the core network as the number of P2MP paths scale up. Hence, the described examples solve various problems specific to network communications and increase the functionality and/or operability of network communication devices.

Optionally, in any of the preceding aspects, another implementation of the aspect provides, further comprising: duplicating, by the processor, the packet to generate a copy of the packet for transmission on a second downstream interface of the transit node; determining, by the processor based on the upstream segment list, a second downstream segment list describing a second sub-tree for the second downstream interface included in the SR P2MP path; replacing, by the processor, the upstream segment list associated with the copy of the packet with the second downstream segment list; and transmitting, by the transmitter, the copy of the packet on the second downstream interface along the SR P2MP path.

Optionally, in any of the preceding aspects, another implementation of the aspect provides, wherein replacing the upstream segment list with the second downstream segment list includes duplicating the packet containing the upstream segment list and then replacing the upstream segment list with the second downstream segment list in the copy of the packet.

Optionally, in any of the preceding aspects, another implementation of the aspect provides, wherein determining the downstream segment list comprises: employing the number of branches in a top SID in the packet to determine a number of next hop nodes; employing the number of SIDs for each next hop node to determine a number of multicast SIDs in each sub-tree associated with the each next hop node; employing the location of the SID block for the sub-tree to locate a multicast SID for at least one next hop node in the sub-tree from the upstream segment list; and generating the downstream segment list including only multicast SIDs associated with the sub-tree for the next hop node associated with the downstream interface.

Optionally, in any of the preceding aspects, another implementation of the aspect provides, wherein each multicast adjacency label is a twenty-bit field uniquely identifying an interface of a corresponding node, wherein each multicast SID further comprises: a four bit field indicating a number of branches of a sub-tree downstream of the corresponding node, and an eight-bit field indicating a number of SIDs included in the sub-tree downstream of the corresponding node.

Optionally, in any of the preceding aspects, another implementation of the aspect provides, wherein each multicast adjacency label is a twenty-bit field uniquely identifying an interface of a corresponding node, wherein one or more of the multicast SIDs are associated with one or more associated information blocks, and wherein each associated information block comprises: an eight-bit field indicating a location of a SID block for a sub-tree downstream of the corresponding node, an eight-bit field indicating a number of branches of the sub-tree downstream of the corresponding node, and an eight-bit field indicating a number of SIDs included in the sub-tree downstream of the corresponding node.

Optionally, in any of the preceding aspects, another implementation of the aspect provides, wherein associated information blocks for egress nodes are omitted from the segment list.

Optionally, in any of the preceding aspects, another implementation of the aspect provides, wherein the transit node does not store a state for the SR P2MP path.

In an embodiment, the disclosure includes a non-transitory computer readable medium comprising a computer program product for use by a first node in a network, the computer program product comprising computer executable instructions stored on the non-transitory computer readable medium such that when executed by a processor cause the first node to perform the method of any of the preceding aspects.

In an embodiment, the disclosure includes an ingress node in an MPLS network, the node comprising: a receiving means for receiving a packet; a processing means for pushing onto the packet a segment list describing a SR P2MP path as a list of multicast SIDs each comprising a multicast adjacency label; and a transmitting means for transmitting the packet on a downstream interface along the SR P2MP path.

SR is a routing protocol that supports routing without maintaining states across a network. SR-MPLS is a type of SR that employs stacks of labels to describe a path. In P2P routing, a packet is encapsulated with the label stack. Each node in a path can pop the top label from the packet and forward the packet according to the next label in the stack. In this way, the only node that maintains a state is the ingress node. Transit nodes and egress nodes forward based on the top label in the label stack, and hence the SR protocol is stateless over the core network. SR works well for P2P paths, but is not designed to support P2MP paths. For example, routing protocols that support P2MP paths are stateful, and hence do not integrate with the stateless approach used in SR-MPLS. For example, some routing protocols compute a P2MP path and create states at each node to support forwarding along the P2MP path.

The present example includes a SR based mechanism for creating and maintaining P2MP paths in a stateless manner through an MPLS network. In some examples, the MPLS network employs an IPv4 addressing scheme with thirty-two bit addresses. An ingress node can create a segment list that describes a P2MP path through the network. The segment list contains multicast SIDs of nodes in the P2MP path. The multicast SIDs may be implemented as multicast adjacency labels that identify links/interfaces for nodes along the P2MP path. A multicast SID contains a number of branches field and a number of SIDs field. The number of branches indicates the number of segments of the P2MP path that extend downstream from the corresponding node. The number of SIDs indicate the number of multicast nodes that are contained in the P2MP path downstream of the corresponding node. In an example, the number of branches field and the number of SIDs field can be included in the thirty-two bit SID containing the multicast adjacency label. In another example, the number of branches field and the number of SIDs field can be included in an A-I field associated with the multicast adjacency label. In either case, the number of branches field and the number of SIDs field can be contained in the multicast SID. Such information can be pushed onto a packet by an ingress node via encapsulation as a label stack. The packet can then be transmitted downstream for duplication and/or routing along the P2MP path as indicated. For example, each current node (e.g., ingress and transit nodes) can duplicate the packet a number of times equal to the branches indicated by the multicast SID in the top label. The current node can then pop labels off the packets and push labels back onto the packets as desired to create segment list(s) that describe the sub-tree of the P2MP path downstream from the corresponding branch(es) of the current node. The current node can then forward each packet according to the top label of the segment list. This allows for the creation of stateless P2MP communication across an SR-MPLS network. As such, the described examples create additional functionality for nodes in an SR-MPLS core network. Further, the described examples remove the need to maintain states in the core network, and hence reduce memory and processor resource usage across the core network as the number of P2MP paths scale up. Hence, the described examples solve various problems specific to network communications and increase the functionality and/or operability of network communication devices.

Optionally, in any of the preceding aspects, another implementation of the aspect provides, wherein the receiving means, processing means, and transmitting means are configured to perform the method of any of the preceding aspects.

In an embodiment, the disclosure includes a transit node in a network, the node comprising: a receiving means for receiving a packet in MPLS format, the packet comprising an upstream segment list describing one or more sub-trees of a SR P2MP path; a processing means for: determining, based on the upstream segment list, a downstream segment list describing a sub-tree for a downstream interface of the transit node included in the SR P2MP path, the downstream segment list comprising a list of multicast SIDs each comprising a multicast adjacency label; and replacing the upstream segment list associated with the packet with the downstream segment list; and a transmitting means for transmitting the packet on the downstream interface along the SR P2MP path.

SR is a routing protocol that supports routing without maintaining states across a network. SR-MPLS is a type of SR that employs stacks of labels to describe a path. In P2P routing, a packet is encapsulated with the label stack. Each node in a path can pop the top label from the packet and forward the packet according to the next label in the stack. In this way, the only node that maintains a state is the ingress node. Transit nodes and egress nodes forward based on the top label in the label stack, and hence the SR protocol is stateless over the core network. SR works well for P2P paths, but is not designed to support P2MP paths. For example, routing protocols that support P2MP paths are stateful, and hence do not integrate with the stateless approach used in SR-MPLS. For example, some routing protocols compute a P2MP path and create states at each node to support forwarding along the P2MP path.

The present example includes a SR based mechanism for creating and maintaining P2MP paths in a stateless manner through an MPLS network. In some examples, the MPLS network employs an IPv4 addressing scheme with thirty-two bit addresses. An ingress node can create a segment list that describes a P2MP path through the network. The segment list contains multicast SIDs of nodes in the P2MP path. The multicast SIDs may be implemented as multicast adjacency labels that identify links/interfaces for nodes along the P2MP path. A multicast SID contains a number of branches field and a number of SIDs field. The number of branches indicates the number of segments of the P2MP path that extend downstream from the corresponding node. The number of SIDs indicate the number of multicast nodes that are contained in the P2MP path downstream of the corresponding node. In an example, the number of branches field and the number of SIDs field can be included in the thirty-two bit SID containing the multicast adjacency label. In another example, the number of branches field and the number of SIDs field can be included in an A-I field associated with the multicast adjacency label. In either case, the number of branches field and the number of SIDs field can be contained in the multicast SID. Such information can be pushed onto a packet by an ingress node via encapsulation as a label stack. The packet can then be transmitted downstream for duplication and/or routing along the P2MP path as indicated. For example, each current node (e.g., ingress and transit nodes) can duplicate the packet a number of times equal to the branches indicated by the multicast SID in the top label. The current node can then pop labels off the packets and push labels back onto the packets as desired to create segment list(s) that describe the sub-tree of the P2MP path downstream from the corresponding branch(es) of the current node. The current node can then forward each packet according to the top label of the segment list. This allows for the creation of stateless P2MP communication across an SR-MPLS network. As such, the described examples create additional functionality for nodes in an SR-MPLS core network. Further, the described examples remove the need to maintain states in the core network, and hence reduce memory and processor resource usage across the core network as the number of P2MP paths scale up. Hence, the described examples solve various problems specific to network communications and increase the functionality and/or operability of network communication devices.

Optionally, in any of the preceding aspects, another implementation of the aspect provides, wherein the receiving means, processing means, and transmitting means are configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a schematic diagram of example encodings of segment lists describing a P2MP path in an MPLS network by employing multicast SIDs with A-I fields.

FIG. 5 is a schematic diagram of additional example encodings of segment lists describing a P2MP path in an MPLS network by employing multicast SIDs with A-I fields.

FIG. 6 is a schematic diagram of example encodings of segment lists describing a P2MP path in an MPLS network by employing multicast SIDs while reducing A-I field usage.

FIG. 7 is a schematic diagram of an example encoding of a multicast SID indicating a link address without employing A-I fields.

FIG. 8 is a schematic diagram of example encodings of segment lists describing a P2MP path in an MPLS network by employing multicast SIDs without A-I fields.

DETAILED DESCRIPTION

Figure 1:
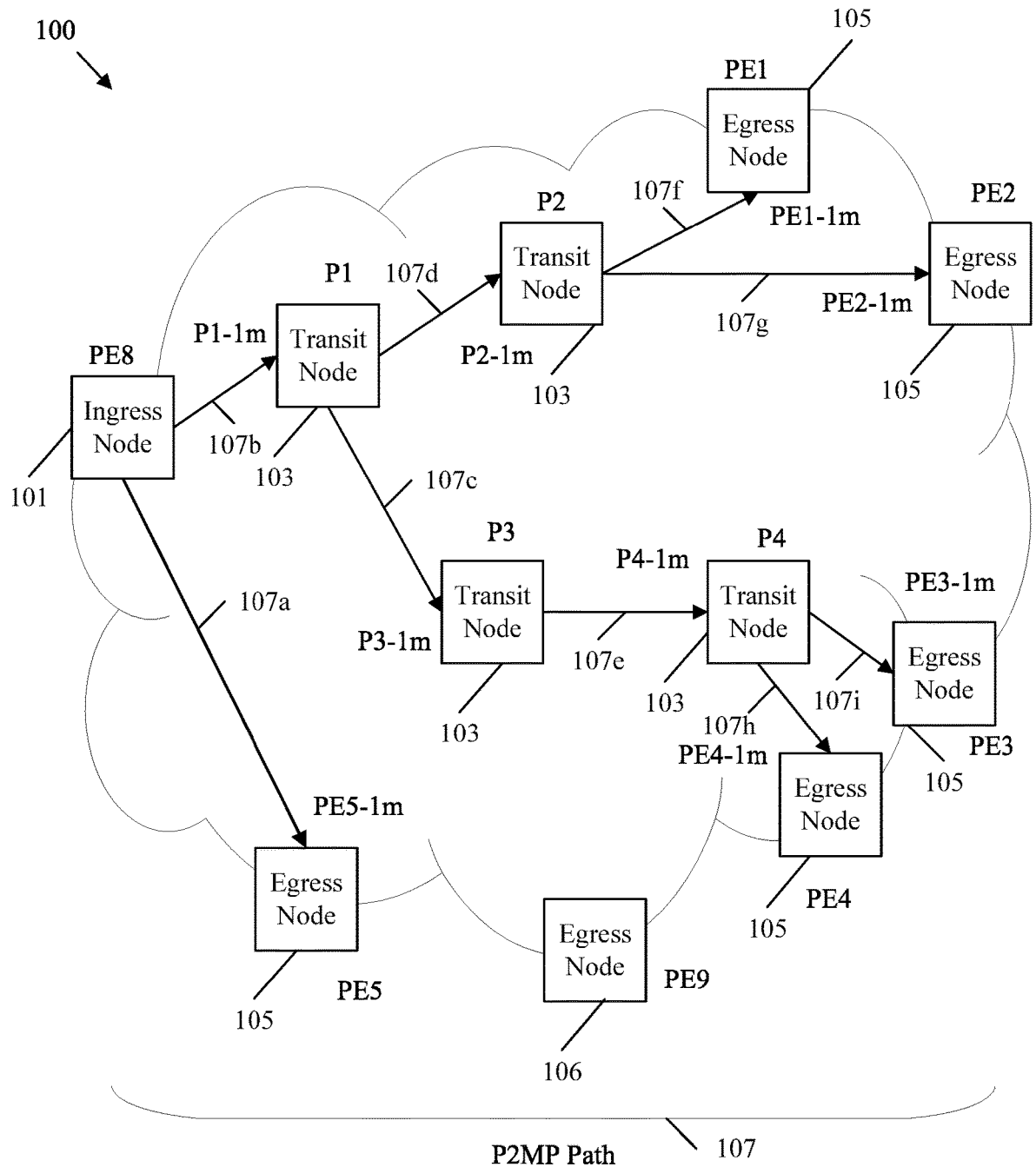
FIG. 1 is a schematic diagram of an example MPLS network configured to implement P2MP paths.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A network is a group of connected nodes that communicate using a shared set of communication protocols. An MPLS network is a network configured to employ MPLS, which is a routing protocol for routing packets based on labels instead of addresses. An ingress node is a node positioned at the edge of a network and that provides handling mechanisms to allow a corresponding packet to enter the network. A transit node is a node in a network configured to forward packets according to predetermined protocols. A packet is a data unit sized for routing/switching by a node and organized according to a predetermined format. SR is a routing protocol that operates by encapsulating packets with labels (e.g., a label stack) or segment identifier (SIDs) that describe a path of segments through a network. A segment list is an ordered description of segments corresponding to a path. An upstream segment list is a segment list received as part of a packet received from an upstream node. A downstream segment list is a segment list included in a packet prepared for downstream transmission. A P2MP path is a path that proceeds from a single origin to multiple destinations. A downstream interface is a port where a node communicates with a link in a downstream direction relative to a corresponding communication. An upstream interface is a port where a node communicates with a link in an upstream direction relative to a corresponding communication.

A tree is a network structure with a single root and multiple leaves connected via a plurality of branches. A sub-tree is a portion of a tree that contains less than all of the elements in the tree. A state is remembered information used for processing data. Stateless is a description of a system that does not use remembered information for processing data. A next hop is a subsequent link or node in a path. A multicast SID is an identifier that uniquely identifies a link and/or node as a segment in a multicast communication. A label is a value that identifies a link/virtual link between nodes in an MPLS network. A multicast adjacency label is a label that identifies a link/node interface for switching as part of a multicast communication. An associated information block is a block of data appended to a thirty-two-bit SID containing a multicast adjacency label. A number of branches is data that indicates a number of branches of a tree/sub-tree that extend downstream from a corresponding multicast node. A number of SIDs is data that indicates a number of multicast links/node interfaces that are contained in a sub-tree rooted at a corresponding node. A block location is a part of a current multicast SID and contains a pointer to specified multicast SID in a segment list, where the specified multicast SID is included in a sub-tree rooted at the current multicast SID.

SR is a routing protocol that supports routing without maintaining states across a network. SR-MPLS is a type of SR that employs stacks of labels to describe a path. In point to point (P2P) routing, a packet is encapsulated with the label stack. Each node in a path can pop the top label from the packet and forward the packet according to the next label in the stack. In this way, the only node that maintains a state is the ingress node. Transit nodes and egress nodes forward based on the top label in the label stack, and hence the SR protocol is stateless over the core network. SR works well for P2P paths, but is not designed to support P2MP paths. For example, routing protocols that support P2MP paths are stateful, and hence do not integrate with the stateless approach used in SR-MPLS. For example, some routing protocols compute a P2MP path and create states at each node to support forwarding along the P2MP path.

Disclosed herein is a SR based mechanism for creating and maintaining P2MP paths in a stateless manner through an MPLS network between a designated source and specific (e.g., less than all) designated destinations. In some examples, the MPLS network employs an Internet Protocol version four (IPv4) addressing scheme with thirty-two bit addresses. An ingress node can create a segment list that describes a P2MP path through the network. The segment list contains multicast SIDs of nodes in the P2MP path. The multicast SIDs may be implemented as multicast adjacency labels that identify links/interfaces for nodes along the P2MP path. A multicast SID contains a number of branches field and a number of SIDs field. The number of branches indicates the number of segments of the P2MP path that extend downstream from the corresponding node. The number of SIDs indicate the number of multicast nodes that are contained in the P2MP path downstream of the corresponding node. In an example, the number of branches field and the number of SIDs field can be included in the thirty-two bit SID containing the multicast adjacency label. In another example, the number of branches field and the number of SIDs field can be included in an associated information (A-I) field associated with the multicast adjacency label. In either case, the number of branches field and the number of SIDs field can be contained in the multicast SID. Such information can be pushed onto a packet by an ingress node via encapsulation as a label stack. The packet can then be transmitted downstream for duplication and/or routing along the P2MP path as indicated. For example, each current node (e.g., ingress and transit nodes) can duplicate the packet a number of times equal to the branches indicated by the multicast SID in the top label. The current node can then pop labels off the packets and push labels back onto the packets as desired to create segment list(s) that describe the sub-tree of the P2MP path downstream from the corresponding branch(es) of the current node. The current node can then forward each packet according to the top label of the segment list. This allows for the creation of stateless P2MP communication across an SR-MPLS network. As such, the described examples create additional functionality for nodes in an SR-MPLS core network. Further, the described examples remove the need to maintain states in the core network, and hence reduce memory and processor resource usage across the core network as the number of P2MP paths scale up. Hence, the described examples solve various problems specific to network communications and increase the functionality and/or operability of network communication devices.

FIG. 1 is a schematic diagram of an example MPLS network 100 configured to employ SR mechanisms to implement P2MP paths. For example, the network 100 is configured to employ SR protocols. SR is a routing protocol that operates by encapsulating packets with labels that describe a list of segments through the network 100. A label is a value that identifies a link/virtual link between nodes in an MPLS network. A stack of labels that describe a path may be referred to as a segment list. A segment list can be defined as an ordered description of segments corresponding to a path. Encapsulation can be used to append a segment list to the packet (e.g., the front of the packet) so that the packet is routed based on the segment list. For example, the nodes of the network 100 are configured to employ encapsulation algorithms to encapsulate packets with labels (e.g., push labels onto packets), pop labels from packets as the packets traverse the network 100, and route the packets according to the labels (e.g., the current top label of a segment list). Network 100 is also configured to employ encapsulation and segment lists to implement a P2MP path as described in greater detail below.

The network 100 is an MPLS network. MPLS is a labeling protocol that provides address labels for use by SR protocols. When used together, the resulting protocol may be referred to as SR-MPLS. SR-MPLS can employ IPv4 or Internet Protocol version six (IPv6) addresses and associated protocols. The IPv4 protocol is a communication protocol for communicating packets over the Internet using a thirty-two bit address mechanism. The IPv6 protocol is a communication protocol for communicating packets over the Internet using a 128-bit address mechanism. The present disclosure focuses on SR-MPLS mechanisms that use IPv4, but such mechanisms can be extended to SR-MPLS IPv6 networks. The network 100 includes an arbitrary number of nodes. Only the relevant nodes are depicted in FIG. 1. The network 100 includes edge nodes and internal nodes. An edge node is any node connected to both the network 100 and some external network or node. An internal node connects only to other nodes in the network 100.

Edge nodes are configured to communicate packets from other networks into/out of the network 100, for example by providing network security and/or translating between external protocols and protocols used by the network 100. In a path routing context, an edge node can act as either an ingress node 101 or an egress node 105. An ingress node 101 is an edge node that accepts a packet from external source(s) for communication across the network 100. Hence, an ingress node 101 is a node positioned at the edge of a network 100 and that provides handling/translation mechanisms to allow a corresponding packet to enter the network 100. An egress node 105 is an edge node that accepts packets from within the network 100 and forwards such packets toward destination(s) outside the network 100. The egress node 105 may also translate packets from the protocols used by the network 100 to external protocols.

The network 100 also includes transit nodes 103. A transit node 103 is an internal node in network 100 configured to forward packets according to predetermined protocols. The transit nodes 103 are connected to each other, the ingress node 101, and/or the egress nodes 105 using links. Such links may include optical links, optical electrical links, electrical links, and/or wireless links. Such links connect to the ingress node 101, the transit nodes 103, and the egress nodes 105 at interfaces. An interface is a port where a node connects to a link. Depending on the example, a node, a node's interface, or both may be assigned addresses to support routing packets. An address is a locally or globally unique set of characters that identifies a corresponding component (e.g., link, node, virtual link, virtual node, etc.) for switching and/or routing purposes.

In the present example, the network 100 includes a P2MP path 107, which is a path that proceeds from a single origin to multiple destinations to exit the network through multiple egress nodes or points. The P2MP path 107 extends from a single predetermined source to a set of predetermined destinations, which may be less than all egress nodes. Hence, the P2MP path 107 is not an implementation of a broadcast transmission. Further, the P2MP path 107 is implemented in a stateless manner by using various labels as described in more detail below. Hence, the P2MP path 107 can be used for communicating a stream of packets from a single source (e.g., a point) to multiple pre-determined destinations (e.g., multiple points) without using a constant memory allocation in the nodes along the P2MP path 107. The P2MP path 107 includes a plurality of path segments 107*a*-107*i*. In the present example, path segment 107*a* extends between node PE8 and node PES; path segment 107*b* extends between node PE8 and node P1; path segment 107*c* extends between node P1 and node P3; path segment 107*d* extends between node P1 and node P2; path segment 107*e* extends between node P3 and node P4; path segment 107*f* extends between node P2 and node PE1; path segment 107*g* extends between node P2 and node PE2; path segment 107*h* extends between node P4 and node PE4; and path segment 107*i* extends between node P4 and node PE3. A P2MP path 107 proceeds from a source towards the destinations. From any point along the P2MP path 107, relative direction can be described as upstream or downstream. Upstream is in the direction of the source from the perspective of a current link and/or node. Downstream is in the direction of a destination from the perspective of a current link and/or node. As such, each node includes upstream interface(s) and downstream interface(s). An upstream interface is a port where a node communicates with a link in an upstream direction relative to a corresponding communication. A downstream interface is a port where a node communicates with a link in a downstream direction relative to a corresponding communication. It should be noted that egress node 106, denoted as node PE9, is not on the P2MP path 107. Accordingly, communications along the P2MP path 107 are not transmitted to egress node 106. As such, the P2MP path 107 does not carry a broadcast transmission.

The P2MP path 107 enters the network 100 at the ingress node 101 on an upstream interface from a source. The ingress node 101 encapsulates packets in the stream with a segment list as described below as well as performs any other protocol translations used to transition packets into network 100. The P2MP path 107 leaves the ingress node 101 on one or more downstream interfaces and proceeds toward the upstream interfaces of the egress nodes 105 associated with various destinations. In some instances, the P2MP path 107 also proceeds to upstream interfaces of transit nodes 103 and through downstream interfaces of such transit nodes 103 toward the egress nodes 105. The egress nodes 105 remove any remaining encapsulation and perform any other relevant protocol translation to transition packets out of the network 100 for transmission toward destinations.

The P2MP path 107 can be described as a tree according to graph theory. A tree is a network structure with a single root and multiple leaves connected via a plurality of branches. Branches are links that proceed downstream from a node and the egress nodes 105 are the leaves. A tree contains sub-trees. A sub-tree is a portion of a tree that contains less than all of the elements in the tree. For example, a portion of a P2MP path 107 that proceeds downstream from a corresponding node (e.g., any node other than the ingress node 101) can be referred to as a sub-tree rooted at the corresponding node.

The P2MP path 107 path operates by causing the ingress node 101 and transit nodes 103 to receive a packet on an upstream interface, copy the packet as desired, and send each packet/packet copy on the downstream interface(s) that branch from the node. As noted above, some networks manage such functionality by storing states in the associated node. A state is remembered information used for processing data. For example, a transit node 103 could receive instructions to perform specific copy and forwarding processes whenever a packet, which is part of an indicated stream, is received. The problem with such an approach is that an increasing number of P2MP paths 107 result in large tables that must be sorted through to obtain proper copying and forwarding instructions. This increases processing resource demand and slows forwarding as the number of P2MP paths 107 in the network 100 increase. Further, the amount of memory in the transit nodes 103 limit the number of P2MP paths 107 that can be setup at any specific point in time. As such, stateful P2MP paths have limited scalability. Further, SR protocols are designed to be stateless. Stateless is a description of a system that does not use remembered information for processing data.

The present disclosure employs mechanisms to create stateless P2MP paths 107 through a network 100. Such mechanisms align with the design principle of SR protocols and allow the number of P2MP paths 107 to be scalable. As such, the network 100 can simultaneously support an arbitrarily large number of stateless P2MP paths 107. As used herein, the mechanisms are stateless because they do not require that a state be maintained in any transit node 103 or egress node 105. The ingress node 101 may still maintain state data for any P2MP path(s) 107 rooted at the ingress node 101.

Stateless forwarding along a P2MP path 107 is performed using a segment list formatted to describe a multicast tree. The segment list employs multicast SIDs that indicate each link/hop in the P2MP path 107. The segment list also contains additional arguments that assist nodes in interpreting the information in the segment list. For each packet in a stream, the ingress node 101 copies the packet as desired and encapsulates the packet(s) by attaching the segment list, for example via push/pop mechanisms. The packet(s) is/are forwarded to the transit nodes 103, which copy each received packet when indicated by the segment list, update the segment list based on predefined rules, and forward such packets based on the updated segment list. For example, a transit node 103 may receive a packet from an upstream direction containing an upstream segment list. The transit node 103 may copy the packet as indicated by the upstream segment list and create one or more downstream segment lists based on the upstream segment list, for example by employing push and pop mechanisms. The transit node 103 can then attach the correct downstream segment list to each packet and forward such packets downstream based on the downstream segment list. An upstream segment list is a segment list included in a packet received from an upstream node. A downstream segment list is a segment list included in a packet prepared for downstream transmission.

An egress node 105 receiving a packet can remove the segment list along with the encapsulation and forward the packet toward a final destination. Once received by the egress node 105, the segment list contains only the multicast SID of the corresponding egress node 105. Hence, the egress node 105 can pop the last label from the segment list and decapsulate the packet prior to forwarding the packet downstream from the network 100. In some examples, the last transit node 103 prior to the egress node 105 may swap the segment list containing the multicast SID of the egress node 105 with a MPLS P2P label for the egress node 105. In such a case, the egress node 105 is unaware of the multicast nature of the communication and processes the packet according to general MPLS principals.

The following example is included to clarify the process of employing a segment list to encode a P2MP path 107. In the present example, ingress node 101 is denoted as provider edge (PE)8. The egress nodes 105 are denoted as PE1, PE2, PE3, PE4, and PE5. The transit nodes 103 are denoted as provider node (P)1, P2, P3, and P4. In MPLS, every link/interface connected to a node is assigned a multicast adjacency label. Each multicast adjacency label is relative to a specific node and is locally significant. The multicast adjacency labels for each node are known by other nodes for routing purposes. For example, the multicast adjacency labels can be broadcast across the network and saved in forwarding tables. As such, each link and corresponding interface of each node can be specifically addressed by a multicast adjacency label. For clarity of discussion, an interface Y of node X is addressed for multicast communication (m) by a multicast adjacency label of X-Ym in FIG. 1. For example, a first interface of node P1 is denoted as P1-1m. In an operational system, such addresses are replaced by locally significant values.

In the present example, the ingress node 101 (node PE8) receives a packet associated with the P2MP path 107. The P2MP path 107 has two branches from PE8, and therefore PE8 makes a copy of the packet. One packet is encapsulated with a segment list that describes the sub-tree rooted at PE8 that extends to PE5. In the present example, the sub-tree that extends from PE8 to PE5 is a single link. In some examples, such a segment list contains a multicast SID of PE5. However, since there is a single link/path with no branches between the ingress node 101 (PE8) and the egress node (PE5), such a segment list may optionally be formatted as an MPLS P2P label describing the link from PE8 to PE5 according to general MPLS protocols. For example, the packet can be encapsulated with a segment list containing a single multicast adjacency label set to PE5-1m. Alternatively, the packet can be encapsulated by a normal MPLS label indicating the egress node. For clarity of discussion, an interface Y of node X is addressed for normal point to point communication (n) by an MPLS label of X-Yn. The packet can then be transmitted to PE5 for decapsulation and forwarding toward a destination.

The other packet is encapsulated with a segment list that describes the sub-tree rooted at PE8 that extends toward PE1-PE4. For example, the segment list may contain a multicast SID for each of the links/nodes in the sub-tree and arguments for each multicast SID. Such arguments may include a number of P2MP path 107 branches extending from the node indicated by the multicast SID. Such arguments may also include a number of multicast SIDs downstream from the node/link associated with the multicast SID. Such arguments may also include a block location argument. The block location argument for a current multicast SID can include a value that points to a location in the segment list that contains the first multicast SID that is part of the sub-tree rooted at the current multicast SID.

The multicast SIDs of the interfaces of the nodes along the corresponding branch are included in the segment list. For the sub-tree of the P2MP path 107 from PE8 to egress nodes 105 denoted as PE1-PE4, the segment list may contain the following multicast adjacency labels: P1-1m, P2-1m, P3-1m, PE1-1m, PE2-1m, P4-1m, PE3-1m, and PE4-1m. In an alternate example, the normal MPLS labels are employed to address the egress nodes 105. This is because the final link to each egress nodes 105 is a P2P link. In such a case, the segment list may contain the following multicast adjacency/MPLS labels: P1-1m, P2-1m, P3-1m, PE1-1n, PE2-1n, P4-1m, PE3-1n, and PE4-1n. In either case, once the segment list is pushed onto the packet, the packet is forwarded from PE8 to P1 according to the top label on the segment list.

The packet is received at P1 and contains a segment list received from an upstream node. This is referred to herein as an upstream segment list for clarity of discussion. Accordingly, an upstream segment list is a segment list included in a packet received from an upstream node. The transit node 103 denoted as P1 creates one or more downstream segment lists for the packet based on the upstream segment list and forwards the packet based on the downstream segment list(s). A downstream segment list is a segment list included in a packet prepared for downstream transmission. In the present example, the first entry of the upstream segment list includes arguments indicating the P2MP path 107 includes two branches downstream from P1. Hence, the packet is duplicated to create two copies of the packet, resulting in one packet for each branch. P1 also constructs different segment lists for each packet, for example by popping and pushing labels as desired. As used herein, a push is an operation that adds an item, such as a label, to the top/front of an ordered list of objects. A pop is an operation that removes the top/front item, such as a label, from the top/front of an ordered list of objects.

Hence, pushing adds a label to the beginning of a packet and popping removes a label from the beginning of the packet. This can be done before or after duplication.

For example, P1 may read and pop the first entry (e.g., the multicast adjacency label for P1-1$m$) from the segment list. P1 then obtains the next two multicast SIDs from the upstream segment list based on the number of branches in the P1-1$m$ or the A-I associated with P1-1$m$, in this case P2-1$m$ and P3-1$m$. The addresses for P2-1$m$ and P3-1$m$ are determined to be next hops, and the multicast adjacency SIDs P2-1$m$ and P3-1$m$ should be the top SIDs for their respective segment lists. As there are only two branches from P1 as indicated by the upstream destination address, P1 determines that the remaining multicast SIDs in the segment list are part of further sub-trees associated with P2 and P3, respectively. For example, P1 can determine that there are two multicast SIDs downstream from P2 and three multicast SIDs downstream from P3 based on the number of SIDs argument in the multicast SID for P2 and P3, respectively. Hence, the first two multicast SIDs after the P3-1$m$ (e.g., PE1-1$m$ and PE2-1$m$) are included in a downstream segment list attached to the packet proceeding from P1 to P2. P3 is associated with three downstream multicast SIDs. Hence the next three multicast SIDs after those associated with P2 from the upstream segment list (e.g., P4-1$m$, PE3-1$m$, and PE4-1$m$) are included in the downstream segment list attached to the packet proceeding from P1 to P3. When used, the block location field can assist the node in locating the correct multicast adjacency SIDs/labels to include in each downstream segment list.

In this way, the segment list is rewritten at each current hop to include only multicast SIDs of nodes/links that are downstream from the current hop via a corresponding downstream branch of the P2MP path 107. In some examples, the upstream segment list is removed prior to copying the packet and then the downstream segment list(s) are generated based on the upstream list and pushed onto the corresponding packet(s). In other examples, the packet is copied while containing the upstream segment list. The upstream segment list in each packet is then replaced by the corresponding downstream segment lists, for example by pushing and popping multicast SIDs as desired. Complete example encodings of the segment list and corresponding descriptions are included in more detail herein below. Once the packets are received at the egress nodes 105 of the P2MP path 107, such packets may contain a single label. Depending on the example, the label is either a multicast adjacency label or a general MPLS label. In either case, the egress node 105 can determine from the presence of a single label that the node is the destination of the packet inside the network 100. Hence, the egress node 105 can decapsulate the packet to remove the segment list/remaining label and forward the packet toward a final destination based on the data contained in the decapsulated packet.

Using the preceding mechanism, packets can be forwarded along a P2MP path 107 without employing a state at either the transit nodes 103 or the egress nodes 105. As such, the disclosed mechanisms allow the creation of P2MP paths 107 in a way that is both scalable and consistent with the SR protocol.

Figure 2:
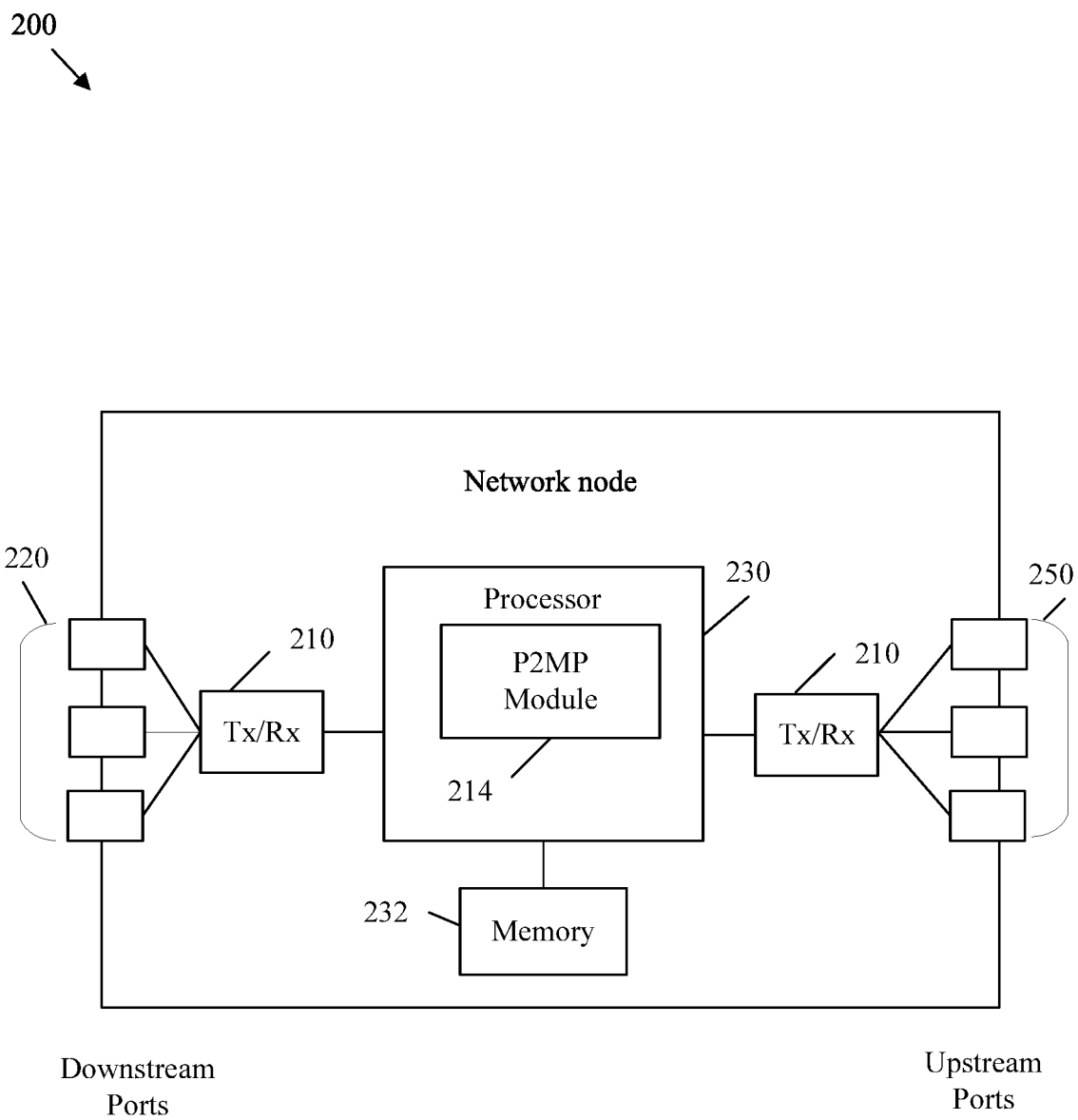
FIG. 2 is a schematic diagram of an example network node.

FIG. 2 is a schematic diagram of an example network node 200 for operation in an MPLS network, such as a node in network 100. For example, network node 200 can be employed to implement an ingress node 101, a transit node 103, and/or an egress node 105. Hence, the network node 200 is suitable for implementing the disclosed examples/embodiments as described herein. The network node 200 comprises communication circuitry, namely, downstream ports 220, upstream ports 250, and/or transceiver units (Tx/Rx) 210, including transmitters and/or receivers for communicating data upstream and/or downstream over a network. The network node 200 also includes a processor 230 including a logic unit and/or central processing unit (CPU) to process the data and a memory 232 for storing the data. The network node 200 may also comprise optical-to-electrical (OE) components, electrical-to-optical (EO) components, and/or wireless communication components coupled to the upstream ports 250 and/or downstream ports 220 for communication of data via electrical, optical, and/or wireless communication networks.

The processor 230 is implemented by hardware and software. The processor 230 may be implemented as one or more CPU chips, cores (e.g., as a multi-core processor), field-programmable gate arrays (FPGAs), application specific integrated circuits (ASICs), and digital signal processors (DSPs) or a combination of these elements. The processor 230 is in communication with the downstream ports 220, Tx/Rx 210, upstream ports 250, and memory 232. The processor 230 comprises a P2MP module 214. The P2MP module 214 implements the disclosed embodiments described herein. Specifically, the P2MP module 214 may maintain SR P2MP paths in an MPLS network by using corresponding segment lists containing multicast SIDs implemented as MPLS labels. The multicast SIDs in the segment list contains data describing the P2MP path, or sub-trees thereof, allowing transit nodes to forward packets across the MPLS network without being preconfigured with state data. For example, the P2MP module 214 may receive a packet, read MPLS label(s) from the segment list in the packet, duplicate the packet, push/pops MPLS labels onto the segment list(s) in the packet(s) to describe downstream sub-tree(s), and/or forward such packet(s) for transit across an MPLS network. Accordingly, the P2MP module 214 may be configured to perform mechanisms to address one or more of the problems discussed above. As such, the P2MP module 214 improves the functionality of the network node 200 as well as addresses problems that are specific to the network communication arts. Further, the P2MP module 214 effects a transformation of the network node 200 to a different state. Alternatively, the P2MP module 214 can be implemented as instructions stored in the memory 232 and executed by the processor 230 (e.g., as a computer program product stored on a non-transitory medium).

The memory 232 comprises one or more memory types such as disks, tape drives, solid-state drives, read only memory (ROM), random access memory (RAM), flash memory, ternary content-addressable memory (TCAM), static random-access memory (SRAM), etc. The memory 232 may be used as an over-flow data storage device, to store programs when such programs are selected for execution, and to store instructions and data that are read during program execution.

Figure 3:
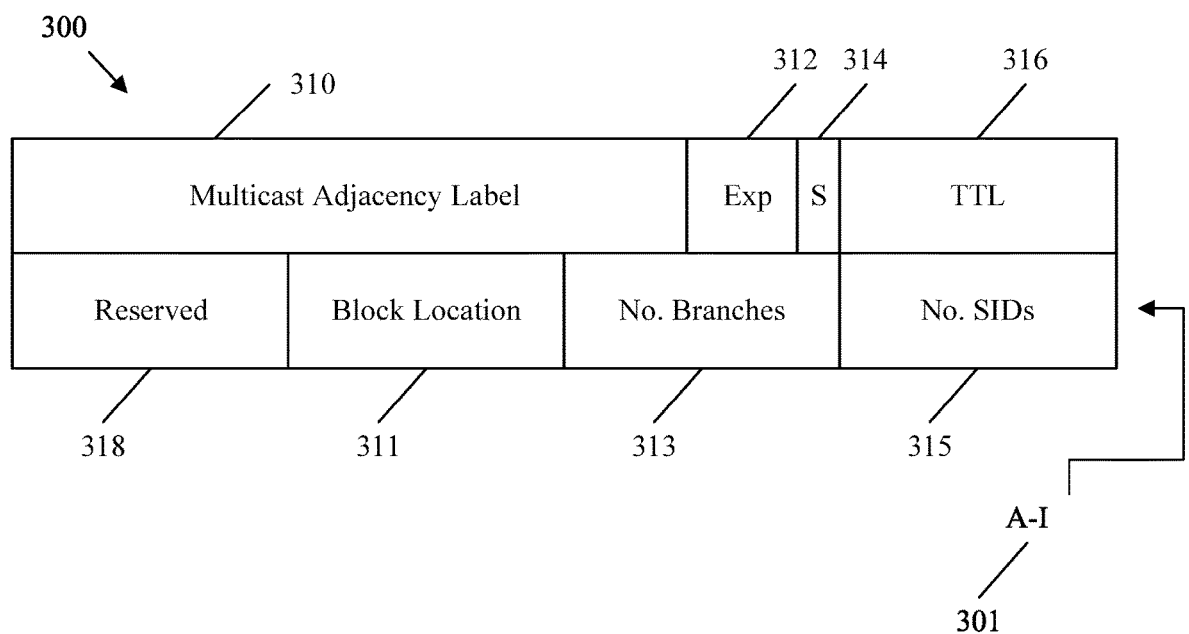
FIG. 3 is a schematic diagram of an example encoding of a multicast segment identifier (SID) indicating a link address and employing associated information (A-I).

FIG. 3 is a schematic diagram of an example encoding of a multicast SID 300 indicating a link address and an A-I 301 data block. An A-I 301 is a thirty-two bit block of data that provides additional details related to the address. The A-I 301 is used to contain arguments that define the structure of a P2MP path and/or sub-trees thereof. The multicast SID 300 can be used to address a link attached to a node, and hence can be used to address a specified interface of a node, such as an upstream and/or downstream interface of a network node 200 and/or any node in network 100. The multicast SID 300 as depicted employs a thirty-two bit word and is sized to carry the A-I 301 data block, which has the same length as an IPv4 address. IPv4 is a routing protocol that employs thirty-two bit addresses. As such, the multicast SID 300 plus the A-I 301 data block is sixty-four bits. The multicast SID 300 comprises a multicast adjacency label 310, an experimental use (Exp) field 312, a bottom of stack (S) bit 314, and a time to live (TTL) field 316, which are collectively thirty-two bits. The multicast SID 300 is modeled after general MPLS labels to be compatible with SR-MPLS routers. The multicast SID 300 also comprises an A-I 301.

The multicast adjacency label 310 is a label that identifies a link/node interface for switching as part of a multicast communication. The multicast adjacency label 310 may be twenty bits long. In an example implementation, every link/interface of each node in a network domain has an associated multicast adjacency label 310. A multicast adjacency label 310 is relative to a specific node and is locally significant. In example, each node in the network domain assigns a multicast label from a predefined multicast label block to each of the node's links as the multicast adjacency label 310 for the link. The node then advertises the information indicating the label and the corresponding link. In another example, a central controller assigns a multicast label from the multicast label block to each link of a node. This creates the multicast adjacency label 310 for each link connected to the node. The central controller can then send the information describing each label and each corresponding link to the node and each neighbor node of the node. A multicast label block is a range of labels that can be used as multicast adjacency labels 310. In one example, a multicast label block is a contiguous range of labels. In one example, the same multicast label block is used by every node. In another example, the multicast label block used by one node may be different from the multicast label block used by another node. In an example, for all n links of a node, link 1, link 2, . . . , and link n, a unique label (or say MPLS label) from the multicast label block for the node is assigned to each of the n links. In one example, the first label in the block is assigned to link 1, the second label in the block is assigned to link 2, . . . , the n-th label in the block is assigned to link n.

The Exp field 312 is a three bit field reserved for experimental use. The S bit 314 is a one bit field that can be set to indicate whether the current multicast SID 300 is the bottom SID in a stack and hence the last multicast SID in a segment list. The TTL field 316 contains data indicating how long the packet containing the multicast SID 300 is still valid and should still be forwarded. For example, the TTL field 316 may contain a counter value that is decremented, and the corresponding packet may be dropped when the counter reaches zero as the packet is considered stale at this point.

The A-I 301 contains thirty-two bits of data that describe the structure of a P2MP path, or sub-trees thereof, associated with the link/node indicated by the multicast SID 300. The A-I 301 contains a reserved field 318, a block location 311, a number of branches 313, and a number of SIDs 315, which may each be eight bits long. The reserved field 318 may be reserved for other purposes, and may be set to all zeros. The block location 311 contains a pointer to specified multicast SID in a segment list. Specifically, the block location 311 points to a specified multicast SID included in a sub-tree rooted at the current multicast SID 300. In an implementation, the block location 311 contains a relative location, such as distance in number of SIDs from the A-I 301, as a virtual SID for the block of SIDs in the sub-tree rooted at the node corresponding to the multicast SID 300. This block location 311 is optional and can be used to speed up the delivery of an incoming packet to multiple outgoing interfaces in parallel.

The number of branches 313 is data that indicates a number of branches of a tree/sub-tree that extend downstream from a node identified by the multicast SID 300. For example, when a node receives a multicast SID 300 identifying the node's interface, the number of branches 313 describes the number of outgoing interfaces along the multicast tree that extend from the node. In another example, when a node receives a multicast SID 300 identifying a node's upstream interface, the number of branches 313 describes the number of outgoing interfaces along the multicast tree that extend from the node. The number of SIDs 315 is data that indicates a number of multicast links/node interfaces that are contained in a sub-tree rooted at a node identified by the multicast SID 300. For example, the number of the SIDs 315 can be used to indicate the number of hops/node interfaces that remain in the multicast sub-tree downstream of the multicast SID 300.

In an example, the multicast SID 300 containing the multicast adjacency label 310 assigned to an interface of a node can be called a multicast adjacency SID of the interface of the node, a multicast adjacency SID of the node, or a multicast adjacency SID (M-Adj-SID) assigned to the interface. The values of the block location 311, the number of branches 313, and the number of SIDs 315 depend on the SR-MPLS P2MP path/tree corresponding to the multicast SID 300.

FIG. 4 is a schematic diagram of example encodings of segment lists 400 and 401 describing a P2MP path in an MPLS network by employing multicast SIDs with A-I fields. Specifically, segment list 400 and segment list 401 describe the P2MP path 107 in network 100. The segment lists 400 and 401 employ multicast SIDs 300 to address the interfaces of nodes, such as node 200, in the P2MP path 107.

Segment list 401 describes the sub-tree of the P2MP path 107 between node PE8 and node PE5, while segment list 400 describes the sub-tree of the P2MP path 107 between node PE8 and nodes PE1 through PE4. Each entry of the segment list 400 and/or 401 contains a multicast SID, such as a multicast SID 300. As such, each entry of the segment list 400 and/or 401 includes a multicast SID including a multicast adjacency label, an Exp field, an S bit, and a TTL field, which are substantially similar to multicast SID 300, multicast adjacency label 310, Exp field 312, S bit 314, and TTL field 316, respectively. Further, each entry of the segment list 400 and/or 401 includes an A-I including a reserved field, a block location, a number of branches, and a number of SIDs, which are substantially similar to A-I 301, reserved field 318, block location 311, number of branches 313, and number of SIDs 315, respectively. It should also be noted each multicast adjacency label X-YmL addresses a node interface as X-Ym where X indicates the node, Y indicates the interface of the node, m indicates a multicast interface, and L indicates label. The multicast node interface X-Ym corresponding to its multicast adjacency label X-YmL in a multicast SID may be used as an identifier or name of the multicast SID or the entry containing X-YmL and its corresponding A-I. For example, P1-1$m$ is used as the name of the first multicast SID in the segment list 400. PE4-1$m$ is used as the name of the last multicast SID in the segment list 400. X-Ym may be used to indicate the thirty-two bits containing X-YmL (e.g., the entry containing X-YmL without its corresponding A-I). For example, P1-1*m* indicates the first thirty-two bits (the first row with P1-1*m*L) in the segment list 400. Similarly, each normal adjacency label X-YnL addresses a node interface as X-Yn where X indicates the node, Y indicates the interface of the node, n indicates a normal interface and L indicates a label. The normal node interface X-Yn may be used as an identifier or name of the normal SID containing X-YnL.

As shown in FIG. 1, the P2MP path 107 includes a single link between node PE8 and node PE5. As such, a segment list 401, as shown in FIG. 4, describing the sub-tree between node PE8 and node PE5 contains a single multicast SID indicating PE5 as the destination. Specifically, segment list 401 contains a single entry with a single multicast SID. The multicast SID includes a multicast adjacency label (PE5-1*m*L) addressed to an upstream interface connected to node PE5 (PE5-1*m*), which indicates that the link to node PE5 is the next hop along the corresponding branch of the P2MP path 107. The A-I for the multicast SID for node PE5 contains arguments including a block location set to zero, a number of branches set to zero, and a number of SIDs set to zero. This indicates a lack of a pointer to a sub-tree downstream of node PE5, no branches of the P2MP path 107 extend beyond node PE5, and no further multicast SIDs are downstream of node PE5, respectively. These arguments each provide enough information to infer that node PE5 is an egress node 105 that terminates a corresponding branch of the P2MP path 107. Hence, no further multicast SIDs are present in the segment list 401. As such, an ingress node 101 may encapsulate a packet with the multicast SID for node PE5 and transmit the packet toward node PE5. Node PE5 can then employ these data to determine to decapsulate the packet and forward the packet toward a final destination outside the MPLS network. In some examples, the ingress node 101 may omit segment list 401 and employ an MPLS protocol label stack instead of segment list 401.

Segment list 400 describes the sub-tree of the P2MP path 107 between node PE8 and nodes PE1 through PE4. An ingress node 101 employing two downstream branches, and hence two segment lists 400 and 401, copies an incoming packet, pushes segment list 400 on one copy of the packet, and pushes segment list 401 on the other copy of the packet. The next hop node along the branch between node PE8 and nodes PE1 through PE4 is node P1. Hence, the first entry in segment list 400 contains the multicast SID with a multicast adjacency label for node P1 (e.g., P1-1*m*L). The multicast SID's A-I for node P1 includes a block location set to zero. This can indicate that the next multicast SID (e.g., P2-1*m*) in the segment list 400 is a next hop downstream from node P1. The multicast SID's A-I for node P1 also includes a number of branches set to two, which indicates P1 includes two downstream branches. The multicast SID's A-I for node P1 also includes a number of SIDs set to seven, which indicates seven hops are downstream from node P1 (the seven hops identified by seven multicast adjacency labels in P2-1*m*, P3-1*m*, PE1-1*m*, PE2-1*m*, P4-1*m*, PE3-1*m*, and PE4-*m*). Accordingly, there are seven entries in the segment list after the multicast SID for node P1. Such entries are included in a predetermined order to allow downstream nodes to determine which nodes are associated with each sub-tree. The ingress node 101 includes such multicast SIDs in the segment list 400 so that such SIDs can be interpreted by downstream nodes as discussed below. The ingress node can encapsulate a packet/packet copy with the segment list 400, for example by pushing each of the multicast SIDs and corresponding A-Is in the segment list onto the packet to create a label stack.

The packet is sent to node P1 based on the first/top label in the segment list, which is set to P1-1*m*L. The top multicast SID includes a block location set to zero, which indicates the next hop, if present, is the next multicast SID in the segment list. The top multicast SID includes an argument indicating that node P1 contains two downstream branches. Hence, the top multicast SID and A-I are read and popped off of the packet, and the packet is copied at node P1 to create two packets based on the top SID from the upstream packet. Two branches from the top SID indicates that the first two multicast SIDs remaining in segment list 400 are the next hops along the two branches. Hence, a first downstream segment list is created containing the multicast SID for node P2 (P2-1*m*), and a second downstream segment list is created containing the multicast SID for node P3 (P3-1*m*). The A-I for the multicast SID for node P2 indicates there are two multicast SIDs downstream of node P2 along the branch extending between node P1 and node P2. Accordingly, the first two multicast SIDs after the P3-1*m* (PE1-1*m* and PE2-1*m*) are included in the segment list for P2-1*m* and the corresponding segment list is applied to the packet for communication from node P1 to node P2. These multicast SIDs can be found quickly by employing the block location of P2-1*m*, which indicates the first of these two multicast SIDs is one entry away and hence positioned immediately after P3-1*m*. Likewise, the A-I for the multicast SID for P3-1*m* indicates that there are three multicast SIDs downstream from node P3. A segment list is created for the packet allocated for transmission from node P1 to node P3. The multicast SID for node P3 is set as the top SID in the segment list for such a packet and the three multicast SIDs positioned after the P2 branch data are included in the segment list for the packet to be transmitted toward node P3 (based on the three value of number of SIDs in the multicast SID for P3-1*m*). These multicast SIDs can be found quickly by employing the block location of P3-1*m*, which indicates the first of these three multicast SIDs is two entries away and hence positioned immediately after PE2-1*m*. The packets with the two different segment lists are then forwarded downstream from node P1 toward node P2 and node P3 based on the top SID/label for each segment list. It should be noted that the creation of the various segment lists at node P1 can be accomplished by popping off the upstream segment list from the packet and/or packet copy, determining the corresponding downstream segment list, and pushing a downstream segment list onto the corresponding packet and/or packet copy.

When the corresponding packet is received at node P2, the number of branches in the top SID is determined to be two based on the arguments in the A-I for the multicast SID for node P2. Hence, the top SID is read and popped, and the packet is copied. The after removal of the top SID, the upstream segment list received at node P2 contains only two entries (PE1-1*m* and PE2-1*m*) and the popped top SID indicates two branches. Hence, node P2 can determine that PE1-1*m* and PE2-1*m* should be set as the top (and only) SID in downstream segment lists for the respective copies of the packet. Such segment lists are included in the respective packets. The packets are then forwarded downstream based on the top SIDs/labels of the downstream segment lists. When such packets are received at nodes PE1 and PE2, the single entry segment lists indicate that nodes PE1 and PE2, respectively, are egress nodes. Hence, nodes PE1 and PE2 determine that the corresponding packets can be decapsulated and forwarded toward their respective destinations.

The packet received at node P3 contains a top SID of the segment list indicating the multicast SID for node P3 and also contains the last three entries of segment list 400 (P3-1*m*, P4-1*m*, PE3-1*m*, and PE4-1*m*). The top SID for node P3 (P3-1*m*) indicates that there is only one branch downstream of node P3, and hence the packet is not copied. Since there is a single branch, the top SID is popped off of the upstream segment list to create the downstream segment list at P3 (P4-1*m*, PE3-1*m*, and PE4-1*m*). The packet is then forwarded from node P3 to node P4 based on the top SID/label of the downstream segment list (P4-1*m*).

The packet received at node P4 contains an upstream segment list with a top SID set to the multicast SID for node P4 and also containing the last two entries of segment list 400 (P4-1*m*, PE3-1*m*, and PE4-1*m*). The A-I of the multicast SID for node P4 indicates there are two branches downstream from node P4. Hence the top SID is read and popped, and the packet is copied. Since the segment list contains two remaining multicast SIDs and the popped top SID indicates two branches, node P4 can determine that nodes PE3 and PE4 are egress nodes. Hence, node P4 can determine that PE3-1*m* and PE4-1*m* should be set as the top (and only) SID in downstream segment lists for the respective copies of the packet. Such segment lists are included in the respective packets. When such packets are received at nodes PE3 and PE4, the single entry segment lists indicate that nodes PE3 and PE4, respectively, are egress nodes. Hence, nodes PE3 and PE4 determine that the corresponding packets can be decapsulated and forwarded toward their respective destinations.

As described above, each node along a P2MP path can read a segment list 400 and/or 401 containing multicast SIDs and A-Is (or portions thereof) to correctly copy packets from a stream and create new segment lists for use in handling such packets by downstream nodes. In this way, a packet can be transmitted from a single point to multiple destinations in a stateless manner.

FIG. 5 is a schematic diagram of additional example encodings of segment lists 500 and 501 describing a P2MP path in an MPLS network by employing multicast SIDs with A-I fields. Segment lists 500 and 501 are alternate encodings of segment lists 400 and 401, respectively. As such, segment list 500 and segment list 501 describe the P2MP path 107 in network 100. The segment lists 500 and 501 employ multicast SIDs 300 to address the interfaces of nodes, such as node 200, in the P2MP path 107.

Segment lists 500 and 501 contain substantially the same information as Segment lists 400 and 401, respectively. However, the encodings of segment lists 500 and 501 consider the fact that some routers may count each thirty-two bit multicast SID and each thirty-two bit A-I as different entries in a label stack for counting purposes. For example, an A-I may be considered to be pseudo SID when performing operations on a segment list. In order to simplify implementation, all values that count a number of multicast SIDs are multiplied by two. In this way, each multicast SID and A-I are considered to be separate entries in the segment list 500/501 for counting purposes. For example, the number of SIDs for P1-1*m* is listed as fourteen because the segment list 500 contains seven multicast SIDs and seven A-Is following the multicast SID and associated A-I for P1-1*m*. As another example, the block location for P2-1*m* is listed as two because the first multicast SID in the sub-tree rooted at P2 is PE1-1*m*, which is two entries away when the multicast SID and A-I for P3-1*m* are considered to be separate entries. As such, all non-zero block locations and all non-zero number of SID arguments are multiplied by two when compared to segment list 400 and 401. The number of branches does not count segment list entries, and hence the number of branches is not multiplied by two.

FIG. 6 is a schematic diagram of example encodings of segment lists 600 and 601 describing a P2MP path in an MPLS network by employing multicast SIDs while reducing A-I field usage. Segment lists 600 and 601 are alternate encodings of segment lists 400 and 401, respectively. Segment lists 600 and 601 are also alternate encodings of segment lists 500 and 501, respectively. As such, segment list 600 and segment list 601 describe the P2MP path 107 in network 100. The segment lists 600 and 601 employ multicast SIDs 300 to address the interfaces of nodes, such as node 200, in the P2MP path 107.

Segment lists 600 and 601 are substantially similar to segment lists 500 and 501, respectively. However, segment lists 600 and 601 omit all A-Is that contain only zero values for block location, number of branches, and number of SIDs. This reduces the size of the encoding without omitting any useful information. Segment lists 600 and 601 employ the same counting mechanism as segment lists 500 and 501. So multicast SIDs with an A-I are counted as two SIDs, while multicast SIDs without an A-I are counted as one SID and are replaced with their corresponding normal SIDs. For example, the number of SIDs for P1-1*m* is listed as ten (instead of fourteen as in FIG. 5) because the segment list 600 contains four normal SIDs, three multicast SIDs, and three A-Is following the multicast SIDs. As another example, the block location for P3-1*m* is listed as two (instead of four as in FIG. 5) because the first multicast SID in the sub-tree rooted at P3 is P4-1*m*, which is two entries away when the SIDs for PE1-1*n* and PE2-*ln* do not include A-Is. As such, each multicast SID and each A-I are considered as separate entries in the segment lists 600 and 601 for counting purposes and the information in the segment list is compressed to reduce processor, memory, and/or network communication resource usage. It should also be noted that counting each multicast SID and each A-I as separate entries allows the extra A-Is to be removed while still allowing each router to easily determine (via counting) which value is a multicast SID and which value is an A-I with examining the actual values.

FIG. 7 is a schematic diagram of an example encoding of a multicast SID 700 indicating a link address without employing A-I fields. The multicast SID 700 is an alternative implementation to multicast SID 300. The multicast SID 700 can be used to address a link attached to a node, and hence can be used to address a specified interface of a node, such as an upstream and/or downstream interface of a network node 200 and/or any node in network 100.

The multicast SID 700 employs a thirty-two bit word. Therefore, the multicast SID 700 is thirty-two bits long. In an example implementation, the multicast SID 700 comprises or consists essentially of a multicast adjacency label 710 which is twenty bits long, a number of branches 713 which is four bits long, and a number of SIDs 715 which is eight bits long. The multicast adjacency label 710, the number of branches 713, and the number of SIDs 715 are substantially similar to the multicast adjacency label 310, the number of branches 313, and the number of SIDs 315, respectively. Unlike multicast SID 300, multicast SID 700 is configured to encode a P2MP path without an A-I field. Accordingly, the multicast SID 700 includes the minimum amount of data that can be used to describe a P2MP path. The benefit of the multicast SID 700 is that multicast SID 700 encodes a single hop on a P2MP path and uses a single thirty-two bit field to do so. However, the multicast SID 700 does not include the block location, Exp field, S bit, TTL field, and reserved field of multicast SID 300. As such, multicast SID 700 does not have access to mechanisms that use such fields to support functionality.

FIG. 8 is a schematic diagram of example encodings of segment lists 800 and 801 describing a P2MP path in an MPLS network by employing multicast SIDs without A-I fields. Specifically, segment list 800 and segment list 801 describe the P2MP path 107 in network 100. The segment lists 800 and 801 employ multicast SIDs 700 to address the interfaces of nodes, such as node 200, in the P2MP path 107. The segment lists 800 and 801 are substantially similar to segment lists 400 and 401, respectively. However, segment lists 800 and 801 omit the Exp field, the S bit, the TTL field, the reserved field, and the block location. This results in a smaller encoding. For example, segment list 800 encodes a P2MP path sub-tree with eight hops using eight thirty-two bit blocks instead of sixteen thirty-two bit blocks as in segment list 400. However, the block location and TTL functionality are omitted.

An example implementation of the embodiments is described as follows. Specifically, this document describes a solution for a SR-MPLS P2MP Path/Tree to deliver traffic from the ingress of the path to the multiple egresses/leaves of the path in a SR domain. There is no state stored in the core of the network for a SR P2MP path, and hence the implementation is similar to a SR P2P path in this solution.

In some systems, a SR multicast or P2MP path/tree may be implemented through using multiple SR P2P paths. The function of a SR P2MP path/tree from an ingress node to multiple (say n) egress/leaf nodes can be implemented by n SR P2P paths. These n P2P paths are from the ingress to those n egress/leaf nodes of the P2MP path/tree. This solution may waste some network resources such as link bandwidth. An alternative solution may employ a number of P2MP chain tunnels to implement a P2MP path/tree from an ingress to n egress/leaf nodes. Each P2MP chain tunnel is a tunnel from the ingress to a leaf node as the tunnel's tail end and may have some leaf nodes as the tunnel's bud nodes along the tunnel. This alternative solution may improve the usage of network resources over the solution above using pure P2P paths. These two solutions are based on SR P2P paths. Another solution for a SR P2MP path/tree is to use a P2MP multicast. For a SR P2MP path/tree from an ingress/root to multiple egress/leaf nodes, a multicast P2MP tree is created to deliver the traffic from the ingress/root to the egress/leaf nodes. The state of the tree is instantiated in the forwarding plane by a controller such as path computation element (PCE) at a root node, intermediate replication nodes, and leaf nodes of the tree. This is approach not consistent with the SR principles in which no state is stored at the core of the network. This document describes a solution for a SR-MPLS P2MP Path/Tree to deliver the traffic from the ingress of the path to the multiple egresses/leaves of the path in a SR domain. This solution uses a P2MP multicast tree without storing the tree's state in the core of the network for a SR P2MP path/tree in a manner similar to a SR P2P path.

The following describes an overview of the P2MP Multicast Tree. For a SR P2P path from an ingress to an egress, a segment list for the path is provided to the ingress. The ingress pushes the list into a packet, and the packet is delivered to the egress according to the segment list without any state in the core of the network. For a SR-MPLS P2MP path from an ingress to multiple egress/leaf nodes, a segment list for the P2MP path is provided to the ingress. The ingress pushes the list into a packet, and the packet is delivered to the multiple egress/leaf nodes according to the segment list without any state in the core of the network. FIG. 1 shows an example SR-MPLS P2MP path from ingress/root PE8 to four egress/leaf nodes PE1, PE2, PE3 and PE4. Nodes P1, P2, P3 and P4 are the transit nodes of the P2MP path. Suppose that X-1$m$L and X-1$n$L are the multicast adjacency label (mL) and normal adjacency label (nL) of node X for the link from X to the first adjacent node, respectively. P1-1$m$L is the multicast adjacency label of P1 for the link from P1 to PE8; P2-1$m$L is the multicast adjacency label of P2 for the link from P2 to P1; P3-1$m$L is the multicast adjacency label of P3 for the link from P3 to P1; P4-1$m$L is the multicast adjacency label of P4 for the link from P4 to P3; PE1-1$m$L is the multicast adjacency label of PE1 for the link from PE1 to P2; and so on. PE1-1$n$L is the normal adjacency label of PE1 for the link from PE1 to P2; PE2-1$n$L is the normal adjacency label of PE2 for the link from PE2 to P2; and so on.

A multicast adjacency segment identifier (M-Adj-SID) is a SID of thirty-two bits containing a multicast adjacency label of twenty bits. Assume that X-1$m$ is the multicast adjacency SID of node X with X-1$m$L. P1-1$m$, P2-1$m$, P3-1$m$, P4-1$m$, PE1-1$m$, PE2-1$m$, PE3-1$m$ and PE4-1$m$ are the SIDs of the nodes on the SR-MPLS P2MP path. They are multicast SIDs or replication SIDs. A normal adjacency segment identifier (Adj-SID) is a SID of thirty-two bits containing a normal adjacency label of twenty bits. Assume that X-1$n$ is the normal adjacency SID of node X with X-1$n$L. PE1-1$n$, PE2-1$n$, PE3-1$n$ and PE4-1$n$ are the SIDs of the nodes on the SR-MPLS P2MP path. They are normal SIDs.

If node P on a SR-MPLS P2MP path has B (B>1) next hop nodes along the path, the SID of node P, P-1$m$, should be a multicast SID when the SID is in the segment list for the P2MP path. The SIDs of the B next hop nodes follow P-1$m$ in the segment list. When node P receives the packet with P-1$m$, node P duplicates and sends the packet to each of the B next hop nodes along the P2MP path. The information such as the number of next hop nodes or branches associated with a multicast SID X-1$m$ of node X on a P2MP path is stored in a virtual SID, named X-1$m$A. X-1$m$A follows X-1$m$ if desired in a segment list. For any egress/leaf node PE of a SR-MPLS P2MP path, the node's normal SID PE-1$n$ can be used in the segment list for the path. For a transit node P of the path, if P has only one branch to the node P's downstream nodes and the node P's direct upstream node has only one branch to node P, then node P's normal SID P-1$n$ can be used in the segment list for the path.

{P1-1$m$, P1-1$m$A, P2-1$m$, P2-1$m$A, P3-1$m$, P3-1$m$A, PE1-1$n$, PE2-1$n$, P4-1$m$, P4-1$m$A, PE3-1$n$, PE4-1$n$} is an example segment list for the SR-MPLS P2MP path in FIG. 1 to be pushed into a packet at ingress/root PE8. Node P1 has two next hop nodes P2 and P3 along the P2MP path. The next hop nodes' SIDs P2-1$m$ and P3-1$m$ follow P1-1$m$, which is P1's multicast SID. When P1 receives a packet transported by the P2MP path, P1 duplicates and sends the packet to the next hop nodes P2 and P3 according to P1-1$m$A, P2-1$m$, and P3-1$m$. The number of branches or next hops from node P1 is a value of one field in P1-1$m$A, called number of branches (No-Branches). The value of No-Branches in P1-1$m$A is two. With this information, node P1 duplicates and sends the packet to two next hop nodes P2 and P3, which are indicated by the two SIDs P2-1$m$ and P3-1$m$ following P1-1$m$.

The number of SIDs of the nodes under node P1 is a value of another field in P1-1mA, called number of SIDs (No-SIDs). The value of No-SIDs in P1-1mA is ten, indicating that there are ten SIDs following P1-1m in the segment list. There are two branches or next hops (e.g., PE1 and PE2) from node P2 and two SIDs (e.g., PE1-1n and PE2-1n) of the nodes under node P2. The values of No-Branches and No-SIDs in P2-1mA are two and two. With this information, before sending the packet to node P2, node P1 pushes the SIDs under node P2 onto the packet. The packet has a new segment list with the SIDs under node P2. The new segment list replaces the old one in the packet. There is one branch or next hop (e.g., P4) from node P3 and four SIDs (e.g., P4-1m, P4-1mA, PE3-1n and PE4-1n) of the nodes under node P3. The values of No-Branches and No-SIDs in P3-1mA are one and four, respectively. With this information, before sending the packet to node P3, node P1 pushes the SIDs under node P3 onto the packet. Each node on the SR P2MP path sends the packet to the node's next hop nodes according to the segment list and no state is stored in any transit node (e.g., the core of the network). The packet is delivered to the egress/leaf nodes from the ingress node.

The following describes an example encoding of a P2MP multicast tree. For each sub-tree STi of a SR-MPLS P2MP path from the ingress node of the P2MP path, suppose that the multicast SID of the next hop node NHi is mSIDi. Further, there are Bi branches (e.g., outgoing links) to the next hop nodes BNHj (j=1, . . . , Bi) from node NHi along the sub-tree. The multicast SID of BNHj is mSIDij. The number of branches (e.g., outgoing links) under the node BNHj (j=1, . . . , Bi) is BBj. Also, the number of SIDs of the nodes under each of the Bi branches from node BNHj is NSj (j=1, . . . , Bi). Sub-tree STi is encoded as segment list {mSIDi,mSIDiA, mSIDi1,mSIDi1A, . . . , mSIDiBi,mSIDiBiA, SegSeq1, SegSeqBi}. mSIDiA contains the number of branches, Bi, in a No-Branches field. mSIDiA also contains the number of SIDs under mSIDi in a No-SIDs field. mSIDijA (j=1, . . . , Bi) contains the number of branches, BBj, in a No-Branches field and the number of SIDs, NSj, in a No-SIDs field. SegSeqj (j=1, . . . , Bi) is the SID sequence in the segment list encoding the sub-trees from node BNHj.

For the P2MP path in FIG. 1 from ingress node PE8 to egress nodes PE1, PE2, PE3 and PE4, there is one sub-tree from PE8. For this sub-tree, the next hop node is P1 and the multicast SID of P1 is P1-1m. There are two branches to the next hop nodes P2 and P3 from node P1 along the sub-tree. The number of SIDs of the nodes under P1 is seven plus three virtual SIDs. The multicast SIDs of P2 and P3 are P2-1m and P3-1m, respectively. The numbers of SIDs of the nodes under these two branches are two and four, respectively. The SIDs of the nodes under P2 are PE1-1n and PE2-1n. The SIDs of the nodes under P3 are P4-1m, P4-1mA, PE3-1n and PE4-1n.

The sub-tree is encoded as segment list {P1-1m, P1-1mA, P2-1m, P2-1mA, P3-1m, P3-1mA, PE1-1n, PE2-1n, P4-1m, P4-1mA, PE3-1n, PE4-1n}. P1-1mA's No-Branches field is set to two and No-SIDs field to ten. P2-1mA's No-Branches field is set to two and P3-1mA's No-Branches field is set to one. P2-1mA's No-SIDs field is set to two and P3-1mA's No-SIDs field is set to four. PE1-1n and PE2-1n are the SID sequence in the segment list encoding the sub-trees from P2. P4-1m, P4-1mA, PE3-1n and PE4-1n are the SID sequence in the segment list encoding the sub-trees from P3. P4-1mA's No-Branches field is set to two and No-SIDs field is set to two. FIG. 6 shows in an example of the segment list, which is an encoding of the P2MP multicast tree for the SR-MPLS P2MP path from PE8 to PE1, PE2, PE3 and PE4. SID P1-1mA indicates that there are two branches and ten SIDs under P1. SID P2-1mA indicates that there are two branches and two SIDs under P2, and the beginning of these two SIDs is two SIDs away from SID P2-1mA. SID P3-1mA indicates that there is one branch and four SIDs under P3, and the beginning of these four SIDs is two SIDs away from SID P3-1mA. SIDs PE1-1n and PE2-1n are the normal SIDs of leaf nodes PE1 and PE2. SID P4-1mA indicates that there are two branches and two SIDs under P4. PE3-1n and PE4-1n are the normal SIDs of leaf nodes PE3 and PE4.

The following describes example procedures or behaviors on the ingress, transit and egress/leaf node of a SR-MPLS P2MP path to deliver a packet received from the path to its destinations. The following describes procedures or behaviors on the ingress node. For a packet to be transported by a SR-MPLS P2MP Path, the ingress of the P2MP path duplicates the packet for each sub-tree of the P2MP path branching from the ingress. The ingress pushes the segment list encoding of the sub-tree onto the packet. The ingress then sends the packet to the next hop node along the sub-tree. For example, there is one sub-tree from the ingress PE8 of the SR-MPLS P2MP path in FIG. 1 via next hop node P1 towards egress/leaf nodes PE1, PE2, PE3 and PE4. For this sub-tree, the ingress PE8 duplicates the packet, pushes the segment list encoding the sub-tree in the packet, and sends the packet to node P1 according to the multicast adjacency label P1-1mL assigned to the link (between PE8 and P1) of P1 in P1-1m. The segment list encoding the sub-tree contains a virtual SID for each multicast SID and is {P1-1m, P1-1mA, P2-1m, P2-1mA, P3-1m, P3-1mA, PE1-1n, PE2-1n, P4-1m, P4-1mA, PE3-1n, PE4-1n}. The contents of the multicast SIDs and their virtual SIDs are shown in FIG. 6.

The following describes procedures or behaviors on a transit node. When a transit node of a SR-MPLS P2MP path receives a packet transported by the P2MP path, the top SID of the packet is a multicast SID of the node, and the packet contains a segment list for the sub-tree starting from the transit node. The segment list comprises the information for encoding the sub-trees under the transit node. If the top SID is a normal SID of the transit node, the nodes behavior is the same as the one for a SR P2P path. For example, when node P1 receives a packet transported by the SR-MPLS P2MP path in FIG. 1, the segment list in the packet is {P1-1m, P1-1mA, P2-1m, P2-1mA, P3-1m, P3-1mA, PE1-1n, PE2-1n, P4-1m, P4-1mA, PE3-1n, PE4-1n}. The top SID P1-1m in the packet is the multicast SID of node P1, which contains the multicast adjacency label P1-1mL assigned to the link of P1 between P1 and PE8. The No-Branches field (which has value of n) in the virtual SID for the top SID indicates that there are n branches (or say sub-trees) under the transit node. The No-SIDs field in the virtual SID indicates the number of SIDs for these n sub-trees under the transit node. After the top SID and corresponding virtual SID are popped, the multicast SIDs of the root nodes of these n sub-trees are the first n multicast SIDs of the segment list in the packet.

For example, the No-Branches field (which has value of two) in the virtual P1-1mA of the top SID P1-1m indicates that there are two branches (or say sub-trees) under node P1. The No-SIDs field (which has value of ten) in P1-1mA indicates that there are ten SIDs for the two sub-trees under node P1. After the top SID and the virtual SID are popped, the first multicast SID (P2-1m) of the segment list is the SID of the root node (P2) of the first sub-tree. The second multicast SID (P3-1m) of the segment list is the SID of the root node (P3) of the second sub-tree. After the multicast SIDs of the root (or next hop) nodes, there are n blocks of SIDs for those n sub-trees. The No-SIDs field (which has value of NS1) and Block-Loc field (DS1) in the virtual SID of the first multicast SID of the root (or say next hop) nodes indicates that there are NS1 SIDs in the first block for the first sub-tree and the beginning of the first block is DS1 SIDs away. Further, the No-SIDs field (which has value of NS2) and Block-Loc field (DS2) in the virtual SID of the second multicast SID of the root nodes indicates that there are NS2 SIDs in the second block for the second sub-tree after the first block and the beginning of the second block is DS2 SIDs' away, and so on.

For example, there are two blocks of SIDs for the two sub-trees under node P1 after the multicast SIDs P2-1*m* and P3-1*m* of the root (or next hop) nodes P2 and P3. The No-SIDs and Block-Loc fields in P2-*m*A of P2-1*m* (the first multicast SID of the root nodes) have values of two and two. This indicates that there are two SIDs in the first block for the first sub-tree, which are PE1-1*n* and PE2-1*n*, and the first block is two SIDs away. The No-SIDs and Block-Loc fields in P3-1*m*A of P3-1*m* (the second multicast SID of the root nodes) have values of four and two, respectively. This indicates that there are four SIDs in the second block for the second sub-tree after the first block, which are P4-1*m*, P4-1*m*A, PE3-1*n* and PE4-1*n*, and the second block is two SIDs away.

The transit node duplicates the packet without the segment list for each sub-tree under the transit node and pushes a new segment list built from the SID block for the sub-tree into the duplicated packet. The transit node sends the packet to a next hop node along the sub-tree according to the label in the top SID in the packet. For example, node P1 duplicates the packet without the segment list for the first sub-tree from P2 as a root towards PE1 and PE2. Node P1 pushes new segment list {P2-1*m*, P2-1*m*A, PE1-1*n*, PE2-1*n*} into the duplicated packet. Node P1 sends the packet to node P2 according to the multicast adjacency label P2-1*m*L in the top SID P2-1*m* of the packet. Node P1 duplicates the packet without the segment list for the second sub-tree from P3 as a root towards PE3 and PE4. Node P1 pushes the new segment list {P3-1*m*, P3-1*m*A, P4-1*m*, P4-1*m*A, PE3-1*n*, PE4-1*n*} into the duplicated packet. Node P1 sends the packet to node P3 according to the multicast adjacency label P3-1*m*L in the top SID P3-1*m* of the packet.

The following describes procedures or behaviors on an egress node. When an egress node of a SR-MPLS P2MP path receives a packet transported by the P2MP path, the top SID of the packet is a SID of the egress node. The egress node pops the top SID and sends the packet to the packet's destination according to the IP destination address. For example, when egress node PE1 of the SR-MPLS P2MP path in FIG. 1 receives a packet transported by the P2MP path, the top SID of the packet is PE1-1*n*, which is a normal SID of egress node PE1. Node PE1 pops PE1-1*n* and sends the packet to the packet's destination according to the IP destination address.

Figure 9:
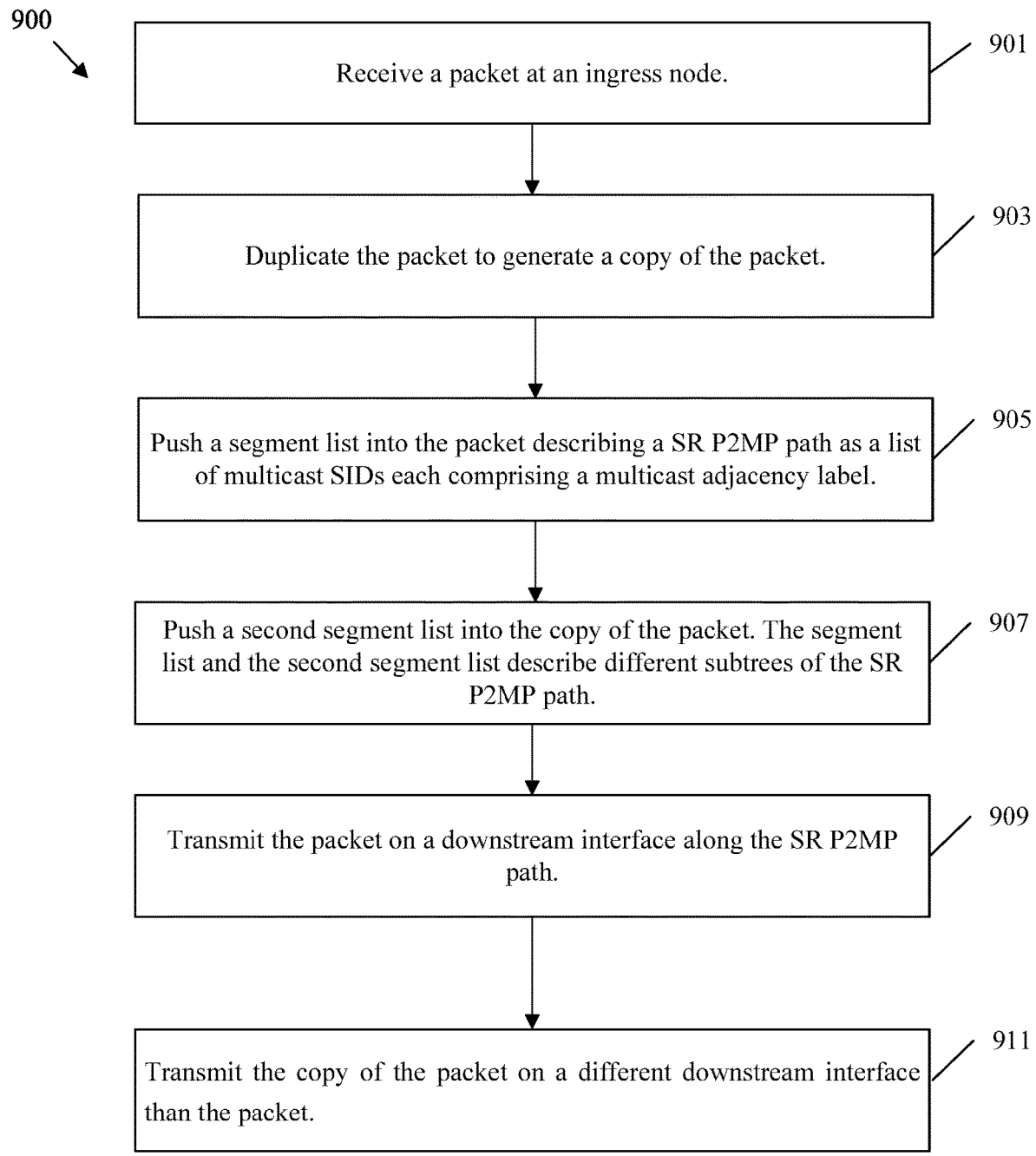
FIG. 9 is a flowchart of an example method of transmitting packets toward a P2MP path by an ingress node at the edge of an MPLS network.

FIG. 9 is a flowchart of an example method 900 of transmitting packets toward a P2MP path, such as P2MP path 107, by an ingress node, such as ingress node 101 and/or network node 200, at the edge of an MPLS network, such as network 100. For example, the ingress node can generate segment lists, such as segment lists 400, 401, 500, 501, 600, 601, 800 and/or 801, that contain multicast SIDs, such as multicast SIDs 300 and/or 700. Such segment lists describe the P2MP path. The ingress node can encapsulate packets from a stream with the segment lists to ensure the packets are forwarded along the P2MP path. It should be noted that the term multicast SID may apply to multicast SIDs and corresponding A-Is, multicast SIDs that do not include A-Is, and/or combinations thereof. It should also be noted that a multicast SID may also be referred to as a multicast adjacency SID in some contexts.

Prior to method 900, a P2MP path is computed from a source to a plurality of destinations via the ingress node and though a network. The P2MP path may be computed by a controller, such as a path computation element, and/or by the ingress node. The ingress node then generates and/or stores one or more segment lists describing the P2MP path (e.g., in a forwarding table) and associates such segment lists with a stream of packets. At step 901, the ingress node receives a packet. The packet may be received in IPv4 format or IPv6 format, depending on the example. The ingress node recognizes that the packet is a part of a stream of packets that is associated with the P2MP path, for example based on the source and/or destination address of the packet.

At step 903, the ingress node optionally duplicates the packet to generate a copy of the packet. For example, the ingress node can search memory (e.g., a forwarding table) for segment lists associated with the packet that describe the P2MP path. When the P2MP path is associated with multiple segment lists, the ingress node duplicates the packet until there is one packet for each segment list.

At step 905, the ingress node pushes a segment list onto the packet. The segment list describes a SR P2MP path as a list of multicast SIDs. Each of the multicast SIDs comprise a multicast adjacency label that addresses a link or an interface of a corresponding node. Specifically, each multicast SID is recognizable by the network as an MPLS label. As such, the segment list includes a plurality of labels. The segment list may be implemented as a label stack. Accordingly, a top label of the segment list contains a multicast adjacency label of a next hop along a sub-tree of the SR P2MP path where the sub-tree is rooted at the ingress node and proceeds along a single downstream branch from the ingress node at a downstream interface. The segment list may be pushed onto the packet by employing an encapsulation protocol, which results in a packet in SR-MPLS format that describes a P2MP path or a sub-tree thereof.

At step 907, the ingress node optionally pushes a second segment list onto the copy of the packet as generated at step 903. Accordingly, step 907 is only employed when the P2MP path includes two or more downstream branches from the ingress node. The second segment list is substantially similar to the segment list of step 905, but describes a different sub-tree of the P2MP path rooted at the ingress node on a second downstream branch and on a second downstream interface. The second segment list may be pushed onto the copy of the packet by employing an encapsulation protocol, which results in a copied packet in SR-MPLS format that describes a sub-tree of a P2MP path. When there are two or more segment lists, as is the case when step 907 is employed, each segment list may describe a different sub-tree of the SR-P2MP path.

The segment list(s) collectively describe a SR-MPLS P2MP path. Hence, the segment lists allow for the creation of a SR P2MP path which is stateless across the network. The segment list(s) may employ multicast SIDs in one of several formats. For example, the multicast SIDs in the segment list(s) may each be thirty-two bits long and comprise a multicast adjacency label that includes a twenty-bit field uniquely identifying an interface of a corresponding node. In some examples, a multicast SID may include and/or be associated with an A-I field. The A-I field/block may be thirty-two bits long. The A-I field/block may include an eight-bit location of a SID block that indicates a location in the segment list of multicast SIDs of a sub-tree downstream of the corresponding node. The A-I field/block may also include an eight-bit number of branches field that indicates a number of branches of the sub-tree downstream of the corresponding node. The number of branches field may be positioned after the block location field in the A-I block/field. The A-I field/block may also include an eight-bit number of SIDs field that indicates a number of multicast SIDs (e.g., hops) that are included in the sub-tree downstream of the corresponding node. The number of SIDs field may be positioned after the number of branches field and the block location field in the A-I block/field. In some examples, A-I blocks/fields for multicast SIDs of egress nodes are omitted from the segment list as the arguments in the A-I blocks/fields for egress nodes are all zero and contain no useful information. In some examples, the block location fields and the number of SIDs fields count each multicast SID and A-I block pair as a single SID/segment list entry. In some examples, the block location fields and the number of SIDs fields count each multicast SID and each A-I block as separate SIDs/segment list entries. In other examples, the multicast SIDs do not include A-I blocks/fields. In such a case, the multicast SID is thirty-two bits long and includes a twenty-bit multicast adjacency label, a four bit number of branches field after the multicast adjacency label, and an eight-bit number of SIDs fields after the number of branches field. In such a case, the block location field is omitted from the multicast SID.

At step 909, the ingress node transmits the packet on a downstream interface along the SR P2MP path according to the top label in the segment list. Likewise, the ingress node optionally transmits the copy of the packet on a second or different downstream interface than the packet at step 911. Step 911 is optional because step 911 is employed only when steps 903 and 907 are employed.

Figure 10:
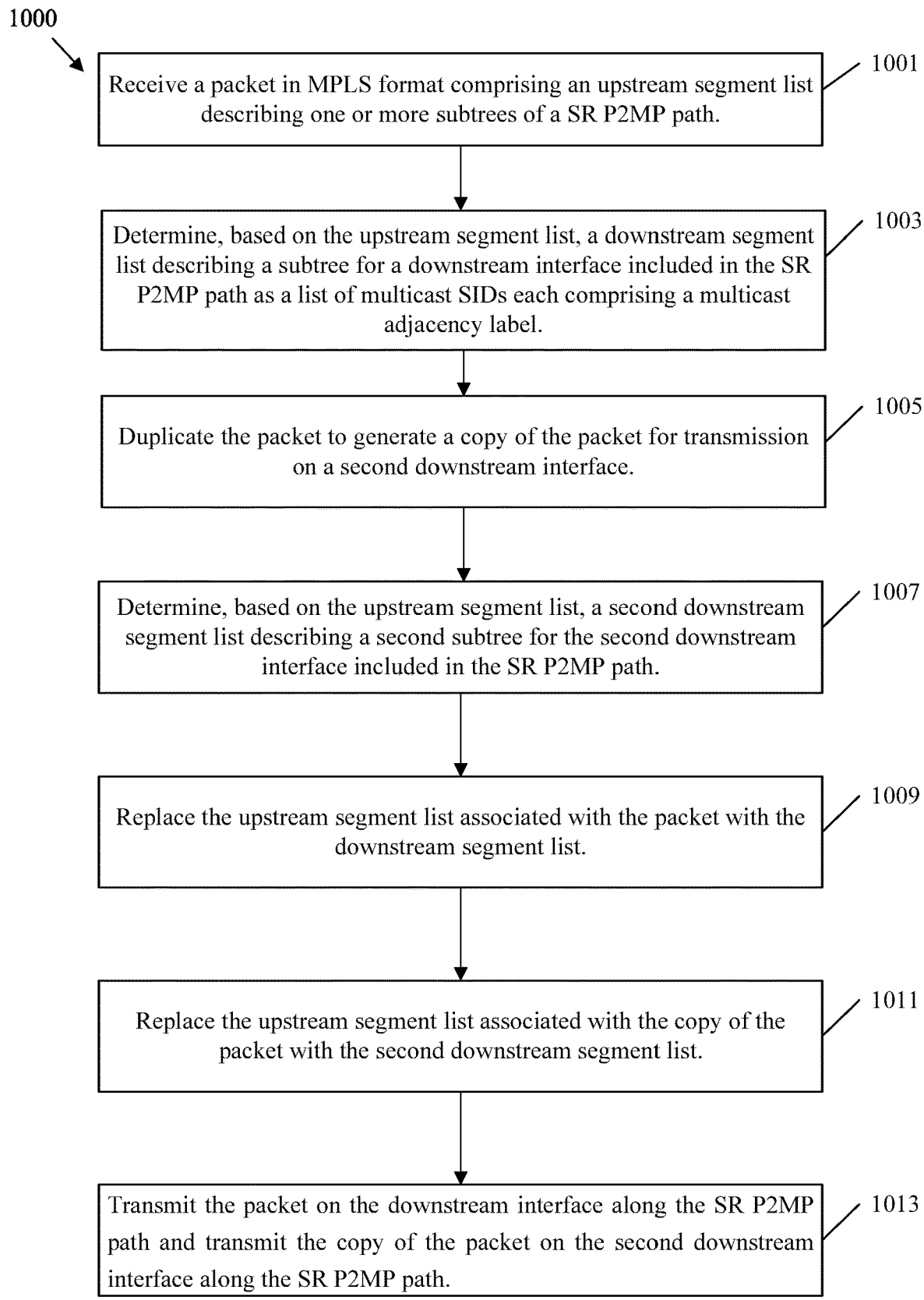
FIG. 10 is a flowchart of an example method of forwarding packets along a P2MP path by a transit node in an MPLS network.

FIG. 10 is a flowchart of an example method 1000 of forwarding packets along a P2MP path, such as P2MP path 107, by a transit node, such as a transit node 103 and/or network node 200, in an MPLS network, such as network 100. For example, the transit node can receive a packet containing an upstream segment list with a top SID/label indicating the transit node. The transit node can then optionally duplicate the packet, create one or more downstream segment lists, and include such downstream segment lists in corresponding packets for transmission along the P2MP path. The upstream segment list and downstream segment list(s), such as segment lists 400, 401, 500, 501, 600, 601, 800 and/or 801, contain multicast SIDs, such as multicast SIDs 300 and/or 700, that indicate links/node interfaces as hops along the P2MP path as well as describe the structure of the P2MP path and/or sub-trees thereof. It should be noted that the term multicast SID may apply to multicast SIDs and corresponding A-Is, multicast SIDs that do not include A-Is, and/or combinations thereof. It should also be noted that a multicast SID may also be referred to as a multicast adjacency SID in some contexts.

The transit node is positioned in a network, such as an MPLS network, and is positioned along a SR P2MP path. However, the transit node does not store a state for the SR P2MP path, which may also be referred to as a SR-MPLS P2MP path. Hence, the transit node may not be aware of the SR P2MP path. As such, the transit node forwards packets along the P2MP path based on segment lists and/or multicast SIDs contained in the packets. Accordingly, the transit node receives a packet in MPLS format at step 1001. The packet may be received directly from an ingress node or may be received via one or more other transit nodes. The packet comprises an upstream segment list describing one or more sub-trees of the SR P2MP path. The upstream segment list may be implemented in an MPLS label stack.

At step 1003, the transit node determines a downstream segment list describing a sub-tree for a downstream interface of the transit node included in the SR P2MP path. The downstream segment list is determined based on the upstream segment list. The downstream segment list comprises a list of SIDs that each comprise a multicast adjacency label. In the event that the top SID of the upstream segment list, as received, contains a number of branches field set to a value of one, then the downstream segment list can be determined by popping the top SID from the upstream segment list. However, when the number of branches field in the top label is a value greater than one, then the multicast SIDs in the upstream segment list should be distributed among two or more downstream segment lists. In this case, the first of the downstream segment lists can be determined as follows. The number of branches included in the top SID in the packet can be used to determine a number of next hop nodes. A number of SIDs field in the multicast SIDs for each next hop node can be employed to determine a number of multicast SIDs in each sub-tree associated with the each next hop node. When present, a location of the SID field for each sub-tree can be employed to locate additional multicast SIDs, when present, that are part of each sub-tree that includes each next hop node from the upstream segment list. The downstream segment list can then be generated to include only multicast SIDs associated with the sub-tree for the next hop node associated with the downstream interface. Further, subsequent downstream segment lists can also be determined by a similar process.

At step 1005, the transit node duplicates the packet to generate a copy of the packet for transmission on a second downstream interface of the transit node. Step 1005 is optional and occurs when the top SID of the upstream segment list, as received, contains a number of branches field set to a value of more than one. For example, the transit node generates copies of the packet until the total number of packets is equal to the value of the number of branches field in the top SID of the upstream segment list. It should be noted that the top SID/label of the upstream segment list contains a label that identifies an upstream interface of the transit node.

At step 1007, the transit node optionally determines a second downstream segment list based on the upstream segment list, for example by employing the process described in step 1003. Step 1007 is employed when the number of branches field in the top SID of the upstream segment list is greater than one, and hence is employed when the packet is copied at step 1005. The second downstream segment list describes a second sub-tree for a second downstream interface included in the SR P2MP path, where the second downstream interface is different from the downstream interface of step 1003. As such, the segment list and the second segment list contain different multicast SIDs and describe different sub-trees of the SR P2MP path rooted at different downstream interfaces of the transit node.

At step 1009, the transit node replaces the upstream segment list associated with the packet with the downstream segment list. Likewise, the transit node replaces the upstream segment list associated with the copy of the packet with the second downstream segment list at step 1011. Replacing the segment lists may be completed by popping, reading, and/or pushing multicast SIDs from/onto the packet/packet copy until the desired segment list is generated. For example, replacing the upstream segment list with the second downstream segment list may include duplicating the packet containing the upstream segment list at step 1005 and then replacing the upstream segment list with the second downstream segment list in the copy of the packet.

The upstream and downstream segment lists describe a sub-tree of a SR-MPLS P2MP path. The segment list(s) may employ multicast SIDs in one of several formats. For example, the multicast SIDs in the segment list(s) may each be thirty-two bits long and comprise a multicast adjacency label that includes a twenty-bit field uniquely identifying an interface of a corresponding node. In some examples, a multicast SID may include and/or be associated with an A-I field. The A-I field/block may be thirty-two bits long. The A-I field/block may include an eight-bit location of a SID block that indicates a location in the segment list of multicast SIDs of a sub-tree downstream of the corresponding node. The A-I field/block may also include an eight-bit number of branches field that indicates a number of branches of the sub-tree downstream of the corresponding node. The number of branches field may be positioned after the block location field in the A-I block/field. The A-I field/block may also include an eight-bit number of SIDs field that indicates a number of multicast SIDs (e.g., hops) that included in the sub-tree downstream of the corresponding node. The number of SIDs field may be positioned after the number of branches field and the block location field in the A-I block/field. In some examples, A-I blocks/fields for multicast SIDs of egress nodes are omitted from the segment list as the arguments in the A-I blocks/fields for egress nodes are all zero and contain no useful information. In some examples, the block location fields and the number of SIDs fields count each multicast SID and A-I block pair as a single SID/segment list entry. In some examples, the block location fields and the number of SIDs fields count each multicast SID and each A-I block as separate SIDs/segment list entries. In other examples, the multicast SIDs do not include A-I blocks/fields. In such a case, the multicast SID is thirty-two bits long and includes a twenty-bit multicast adjacency label, a four bit number of branches field after the multicast adjacency label, and an eight-bit number of SIDs fields after the number of branches field. In such a case, the block location field is omitted from the multicast SID.

At step 1013, the transit node transmits the packet on the downstream interface along the SR P2MP path. Further, the transit node transmits the copy of the packet on the second downstream interface along the SR P2MP path.

Figure 11:
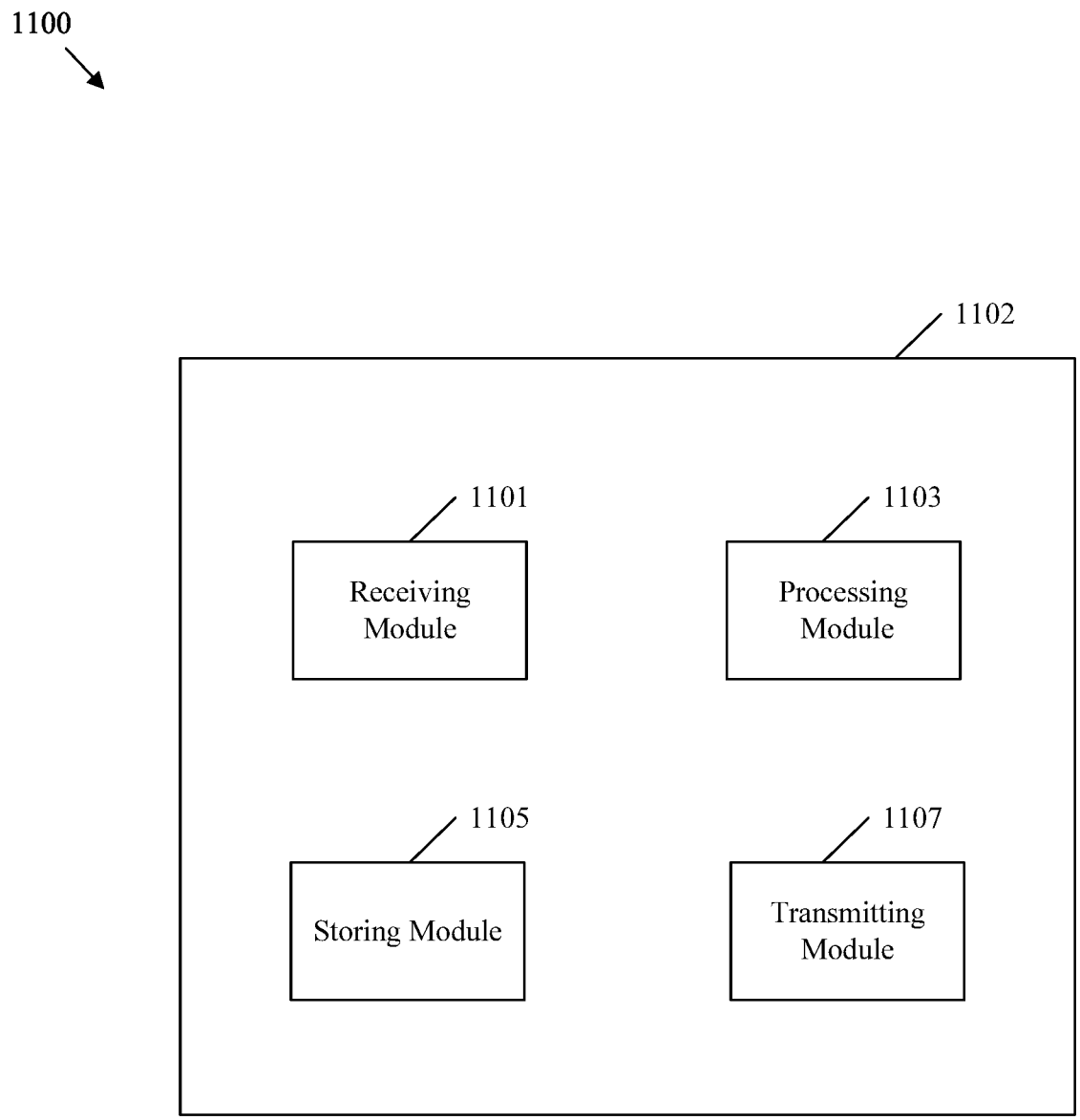
FIG. 11 is an embodiment of a device for maintaining a P2MP path in an MPLS network.

FIG. 11 is an embodiment of a device 1100 for maintaining a P2MP path in an MPLS network. For example, device 1100 may be employed to implement method 900 and/or 1000. Further, device 1100 may be employed as a node, such as a network node 200 and/or an ingress node 101, a transit node 103, and/or an egress node 105 in a network 100. As a specific example, the device 1100 may employ segment lists 400, 401, 500, 501, 600, 601, 800, and/or 801, containing multicast SIDs, such as a multicast SID 300 and/or 700.

In an example, the device 1100 includes a receiving module 1101 for receiving a packet. The device 1100 also includes a processing module 1103 for pushing onto the packet a segment list describing a SR P2MP path as a list of multicast SIDs each comprising a multicast adjacency label. The device 1100 includes a storing module 1105 for storing a packet and/or a segment list. The device 1100 also includes a transmitting module 1107 for transmitting the packet on a downstream interface along the SR P2MP path.

In another example, the device 1100 includes a receiving module 1101 for receiving a packet in MPLS format, the packet comprising an upstream segment list describing one or more sub-trees of a SR P2MP path. The device 1100 also includes a processing module 1103 for determining, based on the upstream segment list, a downstream segment list describing a sub-tree for a downstream interface of the transit node included in the SR P2MP path, the downstream segment list comprising a list of SIDs each comprising a multicast adjacency label. The processing module 1103 is also for replacing the upstream segment list associated with the packet with the downstream segment list. The device 1100 includes a storing module 1105 for storing a packet and/or a segment list. The device 1100 also includes a transmitting module 1107 for transmitting the packet on the downstream interface along the SR P2MP path.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by an ingress node in a Multiprotocol Label Switching (MPLS) network, the method comprising:
   receiving a packet;
   duplicating the packet to generate a copy of the packet;
   pushing onto the packet a first segment list describing a segment routing point to multipoint (SR P2MP) path as a list of multicast segment identifiers (SIDs) each comprising a multicast adjacency label;
   pushing a second segment list onto the copy of the packet;
   transmitting the packet from a downstream interface along the SR P2MP path; and transmitting the copy of the packet from a second downstream interface, wherein the first segment list and the second segment list describe different sub-trees of the SR P2MP path.

2. The method of claim 1, wherein the SR P2MP path is stateless across the network.

3. The method of claim 1, wherein the first segment list includes one or more labels, and wherein a top label of the first segment list is the multicast adjacency label of a next hop along a sub-tree of the SR P2MP path.

4. The method of claim 1, wherein each multicast adjacency label is a twenty-bit field uniquely identifying an interface of a corresponding node.

5. The method of claim 1, wherein each multicast SID further comprises: a number of branches of a sub-tree downstream of a corresponding node, and a number of SIDs included in the sub-tree downstream of the corresponding node.

6. The method of claim 5, wherein the number of branches is a four bit field, and wherein the number of SIDs is an eight-bit field.

7. The method of claim 1, wherein one or more of the multicast SIDs are associated with one or more associated information blocks, and wherein each associated information block comprises: a location of a SID block for a sub-tree downstream of a corresponding node, a number of branches of the sub-tree downstream of the corresponding node, and a number of SIDs included in the sub-tree downstream of the corresponding node.

8. The method of claim 7, wherein the location of the SID block is an eight-bit field, wherein the number of branches is an eight-bit field, and wherein the number of SIDs is an eight-bit field.

9. The method of claim 1, wherein associated information blocks for egress nodes are omitted from the first segment list.

10. A method implemented by a transit node in a network on a segment routing point to multipoint (SR P2MP) path, the method comprising:
receiving a packet in Multiprotocol Label Switching (MPLS) format, the packet comprising an upstream segment list describing one or more sub-trees of the SR P2MP path;
determining, based on the upstream segment list, a downstream segment list describing a sub-tree for a downstream interface of the transit node included in the SR P2MP path, the downstream segment list comprising a list of multicast segment identifiers (SIDs) each comprising a multicast adjacency label;
duplicating the packet to generate a copy of the packet for transmission on a second downstream interface of the transit node;
determining, based on the upstream segment list, a second downstream segment list describing a second sub-tree for the second downstream interface included in the SR P2MP path;
replacing the upstream segment list associated with the packet with the downstream segment list;
replacing the upstream segment list associated with the copy of the packet with the second downstream segment list;
transmitting the packet from the downstream interface along the SR P2MP path; and
transmitting the copy of the packet from the second downstream interface along the SR P2MP path, wherein the downstream segment list and the second downstream segment list describe different sub-trees of the SR P2MP path.

11. The method of claim 10, wherein replacing the upstream segment list with the second downstream segment list includes duplicating the packet containing the upstream segment list and then replacing the upstream segment list with the second downstream segment list in the copy of the packet.

12. The method of claim 10, wherein determining the downstream segment list comprises:
employing a number of branches in a top SID in the packet to determine a number of next hop nodes;
employing a number of SIDs for each next hop node to determine a number of multicast SIDs in each sub-tree associated with each next hop node;
employing a location of a SID block for the sub-tree to locate a multicast SID for at least one next hop node in the sub-tree from the upstream segment list; and
generating the downstream segment list including only multicast SIDs associated with the sub-tree for the next hop node associated with the downstream interface.

13. The method of claim 10, wherein each multicast adjacency label is a twenty-bit field uniquely identifying an interface of a corresponding node, wherein each multicast SID further comprises: a four bit field indicating a number of branches of a sub-tree downstream of the corresponding node, and an eight-bit field indicating a number of SIDs included in the sub-tree downstream of the corresponding node.

14. The method of claim 10, wherein each multicast adjacency label is a twenty-bit field uniquely identifying an interface of a corresponding node, wherein one or more of the multicast SIDs are associated with one or more associated information blocks, and wherein each associated information block comprises: an eight-bit field indicating a location of a SID block for a sub-tree downstream of the corresponding node, an eight-bit field indicating a number of branches of the sub-tree downstream of the corresponding node, and an eight-bit field indicating a number of SIDs included in the sub-tree downstream of the corresponding node.

15. The method of claim 10, wherein associated information blocks for egress nodes are omitted from one or both of the upstream segment list and the downstream segment list.

16. The method of claim 10, wherein the transit node does not store a state for the SR P2MP path.

17. A non-transitory computer readable medium comprising a computer program product for use by a first node in a network, the computer program product comprising computer executable instructions stored on the non-transitory computer readable medium such that when executed by a processor cause the first node to:
receive a packet;
duplicate the packet to generate a copy of the packet;
push onto the packet a segment list describing a segment routing point to multipoint (SR P2MP) path as a list of multicast segment identifiers (SIDs) each comprising a multicast adjacency label;
push a second segment list onto the copy of the packet;
transmit the packet from a downstream interface along the SR P2MP path; and
transmit the copy of the packet from a second downstream interface, wherein the segment list and the second segment list describe different sub-trees of the SR P2MP path, wherein the SR P2MP path is stateless across the network, wherein the segment list includes one or more labels, wherein a top label of the segment list is the multicast adjacency label of a next hop along a sub-tree of the SR P2MP path, and wherein each multicast adjacency label is a twenty-bit field uniquely identifying an interface of a corresponding node.

* * * * *

UNITED STATES PATENT AND TRADEMARK OFFICE
CERTIFICATE OF CORRECTION

PATENT NO. : 12,170,613 B2
APPLICATION NO. : 18/149514
DATED : December 17, 2024
INVENTOR(S) : Huaimo Chen et al.

Page 1 of 1

It is certified that error appears in the above-identified patent and that said Letters Patent is hereby corrected as shown below:

On the Title Page

Item (71) Applicant: Delete "Huawei Technologies Co., Ltd., Guangdong (CN)" and insert -- Huawei Technologies Co., Ltd., Shenzhen (CN) --.

Signed and Sealed this
Twenty-first Day of January, 2025

Coke Morgan Stewart
*Acting Director of the United States Patent and Trademark Office*